United States Patent
Talha et al.

(10) Patent No.: US 12,135,924 B2
(45) Date of Patent: Nov. 5, 2024

(54) STRUCTURAL SIMULATION OF A MECHANICAL PART

(71) Applicant: DASSAULT SYSTEMES, Velizy Villacoublay (FR)

(72) Inventors: Yasmine Talha, Velizy Villacoublay (FR); David Benincasa, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 807 days.

(21) Appl. No.: 17/164,715

(22) Filed: Feb. 1, 2021

(65) Prior Publication Data

US 2021/0240887 A1 Aug. 5, 2021

(30) Foreign Application Priority Data

Jan. 31, 2020 (EP) .................................... 20305093

(51) Int. Cl.
*G06F 30/20* (2020.01)
*G06F 30/10* (2020.01)
(Continued)

(52) U.S. Cl.
CPC .............. *G06F 30/20* (2020.01); *G06F 30/10* (2020.01); *G06F 30/23* (2020.01); *G06F 2111/10* (2020.01); *G06Q 10/101* (2013.01)

(58) Field of Classification Search
CPC .................................. G06F 30/10; G06F 30/20
(Continued)

(56) References Cited

U.S. PATENT DOCUMENTS

| 9,517,613 B2 * | 12/2016 | Moram | F01D 21/045 |
| 2009/0271156 A1 * | 10/2009 | Kageura | G06F 30/23 |
| | | | 703/1 |

FOREIGN PATENT DOCUMENTS

| EP | 1 460 567 A2 | 9/2004 |
| EP | 1 460 567 A3 | 9/2004 |

(Continued)

OTHER PUBLICATIONS

Chris Tierney, et al.; "Automatic Dimensional Reduction and Meshing of Stiffened Thin-Wall Structures"; Article in Engineering With Computers; Oct. 2013; 702 pgs.

(Continued)

*Primary Examiner* — Andre Pierre Louis
(74) *Attorney, Agent, or Firm* — Oblon, McClelland, Maier & Neustadt, L.L.P.

(57) ABSTRACT

A computer-implemented method of B-rep processing for performing structural simulation of a mechanical part including obtaining a first B-rep is described. The first B-rep forms a solid representing the mechanical part. The method further comprises providing a predetermined thickness threshold. The method further comprises constructing, based on the first B-rep, a second B-rep. The second B-rep forms a non-manifold object representing the mechanical part. The constructing comprises identifying one or more thin regions of the first B-rep. Each thin region has a thickness smaller than the predetermined thickness threshold. The constructing further comprises computing, for each identified thin region, a respective mid-surface of the identified thin region. The constructing further comprises replacing the identified thin region by the respective mid-surface.

20 Claims, 26 Drawing Sheets

(51) Int. Cl.
*G06F 30/23* (2020.01)
*G06F 111/10* (2020.01)
*G06Q 10/101* (2023.01)

(58) Field of Classification Search
USPC .............................................. 703/1
See application file for complete search history.

(56) References Cited

FOREIGN PATENT DOCUMENTS

| JP | H06-259505 A | 9/1994 |
| JP | 2017-004143 A | 1/2017 |
| JP | 2019-106188 A | 6/2019 |

OTHER PUBLICATIONS

F. Harary; "Graph Theory"; Addison-Wesley; 1969, 281 pgs.
C.S. Chong, et al.; "Automatic Solid Decomposition and Reduction for Non-Manifold Geometric Model Generation"; Computer-Aided Design; Elsevier Publishers BV.; Barking; GB; vol. 36, No. 13; Nov. 1, 2004; 13 pgs.
Huawei Zhu, et al.; "Automatic Hierarchical Mid-Surface Abstraction of Thin-Walled Models Based on Rib Decomposition"; 2015; 14th International Conference on Computer-Aided Design and Computer Graphics; 8 pgs.
Extended Search Report issued Jul. 31, 2020 in Europe Patent Application No. 20305093.5-1224; 10 pgs.
Office Action dated Sep. 17, 2024, issued in counterpart JP Application No. 2021-010006, with machine English Translation, (7 pages).

\* cited by examiner

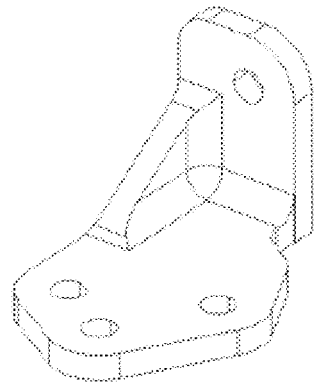
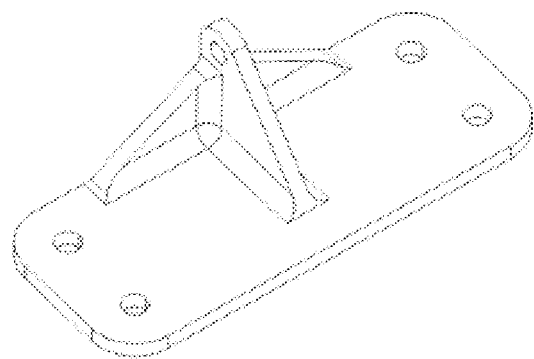
FIG. 5   FIG. 6
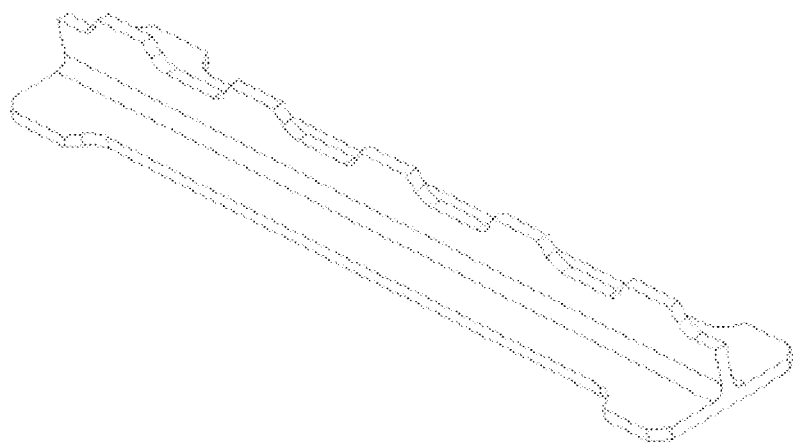
FIG. 7

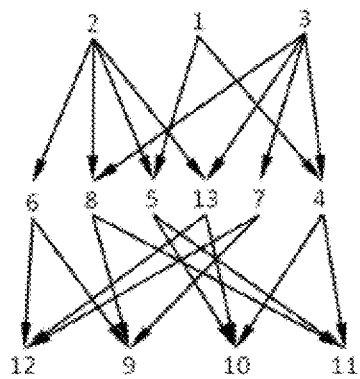
FIG. 13
1 → Plane
2 → Cylindrical surface
3
4 → Circle 1
5
6 → Circle 2
7
8 → Line 1
13 → Line 2
10 → Point 1
11 → Point 2
12 → Point 3
9 → Point 4
FIG. 14
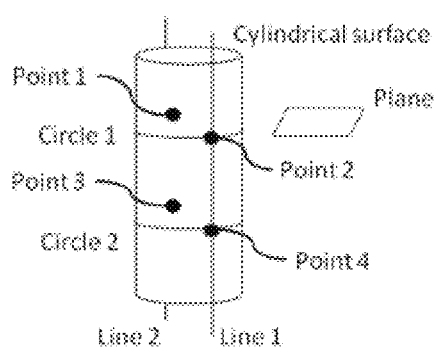
FIG. 15
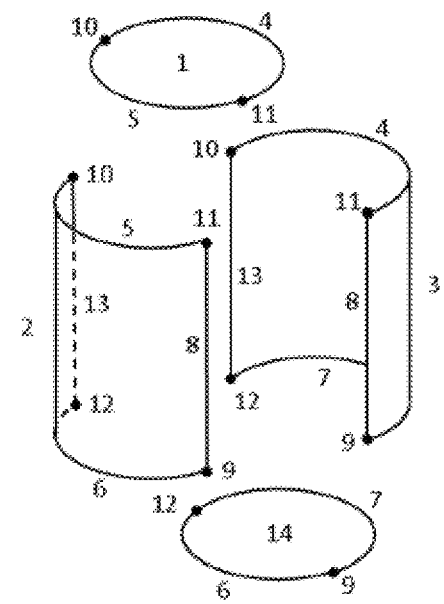
FIG. 16

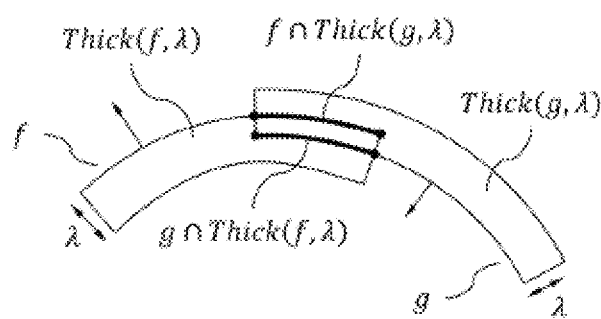
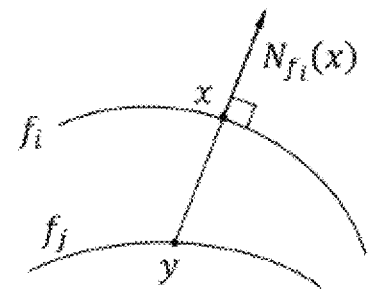
FIG. 32
FIG. 33
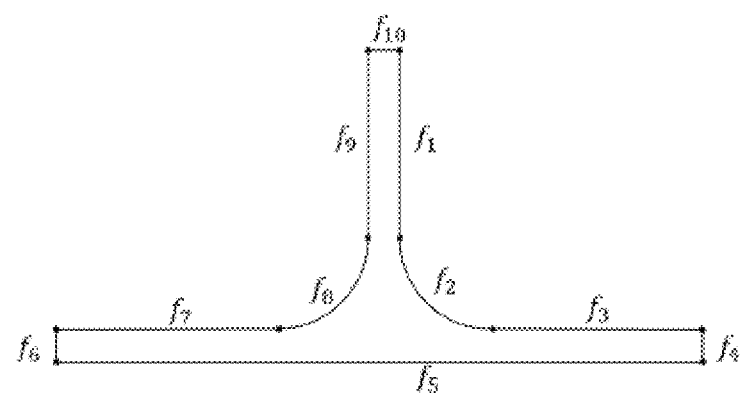
FIG. 34

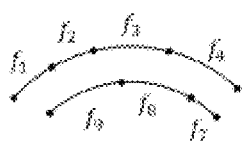 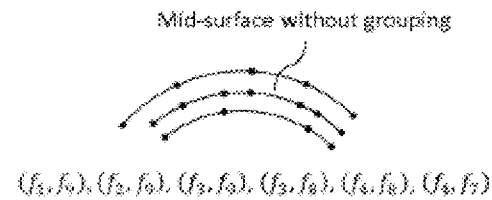 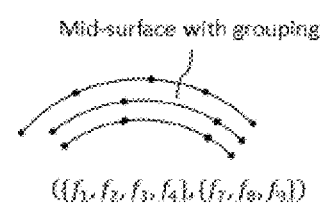
FIG. 35              FIG. 36              FIG. 37
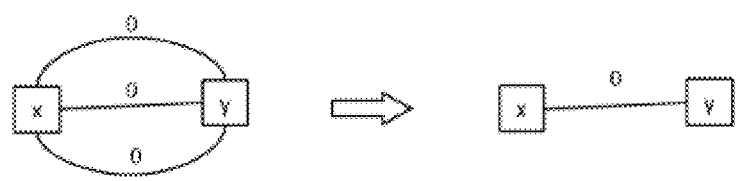
FIG. 38

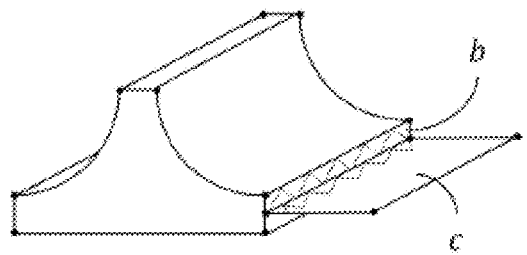
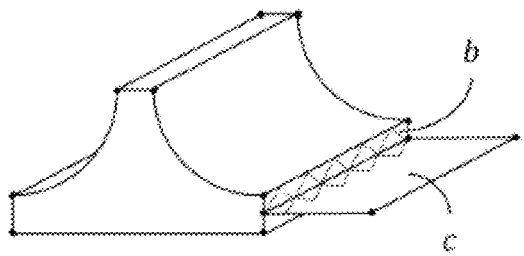
FIG. 50    FIG. 51
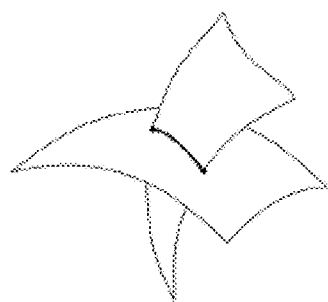
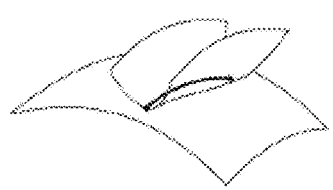
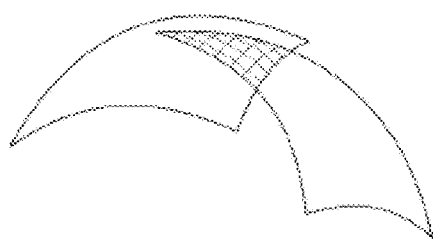
FIG. 52    FIG. 53    FIG. 54

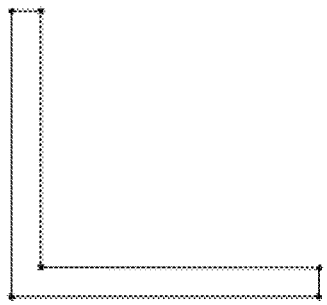
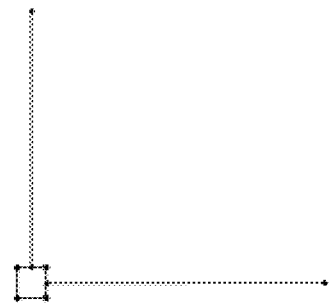
FIG. 62  FIG. 63
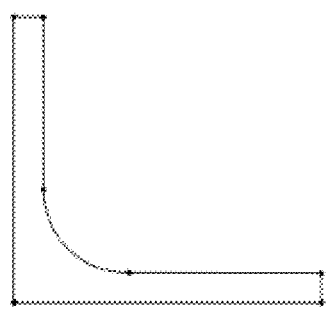
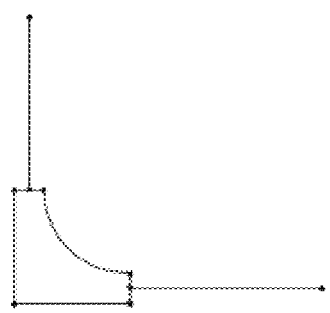
FIG. 64  FIG. 65

STRUCTURAL SIMULATION OF A MECHANICAL PART

CROSS-REFERENCE TO RELATED APPLICATIONS

This application claims priority under 35 U.S.C. § 119 or 365 to European Application No. 20305093.5, filed Jan. 31, 2020. The entire contents of the above application(s) are incorporated herein by reference.

FIELD

The disclosure relates to the field of computer programs and systems, and more specifically to a method, system and program of B-rep processing for performing structural simulation of a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. It relates to software solutions for simulating the physical behavior of a future product. CAM is an acronym for Computer-Aided Manufacturing, e.g. It relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In mechanical design, a part being designed may be represented by a virtual solid through the boundary representation (B-rep) format. For structural numerical simulation purpose, a processing of the solid is often used.

Existing methods of B-rep processing for performing structural simulation of a mechanical part do not produce satisfactory results.

Within this context, there is still a need for an improved method of B-rep processing for performing structural simulation of a mechanical part.

SUMMARY

It is therefore provided a computer-implemented method of B-rep processing for performing structural simulation of a mechanical part. The method comprises providing a first B-rep. The first B-rep forms a solid representing the mechanical part. The method further comprises providing a predetermined thickness threshold. The method further comprises constructing, based on the first B-rep, a second B-rep. The second B-rep forms a non-manifold object representing the mechanical part. The constructing comprises identifying one or more thin regions of the first B-rep. Each thin region has a thickness smaller than the predetermined thickness threshold. The constructing further comprises computing, for each identified thin region, a respective mid-surface of the identified thin region. The constructing further comprises replacing the identified thin region by the respective mid-surface.

This constitutes an improved method of B-rep processing for performing structural simulation of a mechanical part.

Notably, the first B-rep forms a solid representing the mechanical part, the solid having one or more thin regions representing thin walls of the mechanical part. In other words, the solid features one or more local thick regions (i.e. local thick volumes/solid regions) as well as one or more local thin walls (I.e, the thin identified regions). The method identifies these one or more local thin walls. It is particularly relevant in mechanical design/solid modeling, to identify local thin walls.

Furthermore, the identification of the thin regions/thin walls is accurate, thanks to the predetermined thickness threshold, which is determined based on mechanical/structural considerations. Indeed, the method identifies as the thin regions only regions of the first B-rep having a thickness smaller than the predetermined thickness threshold, i.e. only truly thin regions of the B-rep, that is regions truly representing parts of the mechanical part considered as thin walls from the mechanical/structural point of view.

Moreover, the method goes beyond the identification of the local thin walls, which is already per se relevant in mechanical design/solid modeling, and computes, based on these identified thin regions/local thin walls a second B-rep. To do so, the method notably computes mid-surfaces each respective to an identified thin region and replaces each identified thin region by a respective computed mid-surface. This computation is part of a construction of the second B-rep, and results in that the second B-rep is a mixed surface/volume non-manifold object approximating well the first B-rep. Indeed, thin walls of the first B-rep are well approximated by the mid-surfaces which replace them. This approximation is accurate, as the thin walls have a thickness lower than the thickness threshold. This amounts to say that the method constructs the second B-rep from the first B-rep by approximating accurately the thin walls of the first B-rep by mid-surfaces. The resulting second B-rep thus forms a non-manifold object representing accurately the mechanical part. The ability of designing accurately, in a single design process, such a second B-rep featuring both thin and thick regions is an improvement that the method brings to the field of mechanical design. Notably, the method avoids a long and cumbersome separated design of thin and thick regions, by means of separate design processes.

The second B-rep constructed by the method is particularly relevant in mechanical design. Notably, the second B-rep, as a mixed surface/volume object, may be meshed, with a hybrid mesh comprising both 2D and 3D elements, as known per se in the fields of mechanical design and structural simulation. The mid-surfaces are meshed with 2D elements, and the remaining solid parts of the second B-rep with 3D elements. Such a hybrid mesh allows to perform structural simulations of the mechanical part in a fast and robust manner. Indeed, the surface/2D parts of the hybrid mesh cost less in a structural simulation than volume/3D parts. The hybrid mesh thus allows for a fast structural simulation, i.e. faster than a structural simulation performed on a 3D mesh. The structural simulation is in addition accurate and robust, as the thin regions of the mechanical part are accurately approximated by the mid-surfaces in the second B-rep. This results in that the hybrid mesh is as well an accurate meshing for performing the structural simulation, ensuring an accurate structural simulation.

The method may comprise, in addition of the construction of the second B-rep, meshing the second B-rep into a hybrid mesh and performing a structural simulation of the mechanical part based on the hybrid mesh. Said otherwise, the method may, in a single design process, construct the second B-rep, perform both a surface and volume meshing of the second B-rep, and then perform a fast and accurate structural simulation. The method may thus form an improved process of structural simulation, notably as compared to performing separated 2D and 3D meshing and structural simulation processes for thin and thick parts of a same B-rep, respectively, which would be longer and cumbersome.

The method may comprise one or more of the following:
the identifying of the one or more thin regions comprises determining first and second groups each of one or more adjacent and tangent faces of the first B-rep, each first group being locally parallel to a respective second group and forming with the respective second group at least a part of a boundary of a thin region;
the determining of the first and second groups comprises:
determining faces of the first B-rep each locally parallel to a respective other face; and
grouping first determined adjacent and tangent faces locally parallel to second determined adjacent and tangent faces into first and second groups;
the determining of the faces comprises:
determining candidate faces, a candidate face being a first face of the first B-rep for which a point is at a distance lower than the thickness threshold from a second face of the first B-rep; and
determining, among candidate faces, first and second faces, each first face being locally parallel to a respective second face;
two faces are locally parallel when:
a ratio between a largest distance between the faces and a smallest distance between the faces is lower than one plus a threshold; and/or
a ratio between the difference between a largest distance between the faces and a smallest distance between the faces and at least one of the faces' diagonal length is lower than a tangent of a G1 continuity tolerance angle;
the computing of a respective mid-surface for each identified thin region comprises, for each determined first group locally parallel to a determined respective second group, computing, as a mid-surface, an intersection between a result of a first thickening operation of the first group and a result of an offset operation of the respective second group;
the offset operation is an offset of an extrapolation of the respective second group, and/or the first thickening operation has a thickening distance larger than the thickness threshold;
the constructing further comprises computing one or more local thick regions of the first B-rep, the computing of the one or more thick regions comprising:
for each determined first group locally parallel to a determined respective second group, computing an intersection of a result of a second thickening operation of the first group and a result of a third thickening operation of the respective second group; and
subtracting from the first B-rep each computed intersection;
the second thickening operation of the first group is a thickening of an extrapolation of the first group, and the third thickening operation of the respective second group is a thickening of an extrapolation of the respective second group, the extrapolation of the first group and the extrapolation of the respective second group having different extrapolation values, and/or the third thickening operation and the second thickening operation have each a thickening distance larger than the thickness threshold;
the replacing comprising assembling the respective mid-surface with a respective computed thick region by assembling a boundary edge of the respective mid-surface with a splitting edge of the respective computed thick region;
the method further comprises meshing the second B-rep into a hybrid mesh; and/or
the method further comprises performing a structural simulation of the mechanical part based on the hybrid mesh.

It Is further provided a computer program comprising instructions for performing the method.

It is further provided a computer readable storage medium having recorded thereon the computer program.

It Is further provided a system comprising a processor coupled to a memory and a graphical user interface, the memory having recorded thereon the computer program.

BRIEF DESCRIPTION OF THE DRAWINGS

Embodiments will now be described, by way of non-limiting example, and in reference to the accompanying drawings, where:

FIGS. 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 and 75 illustrate the method.

DETAILED DESCRIPTION

Figure 1:
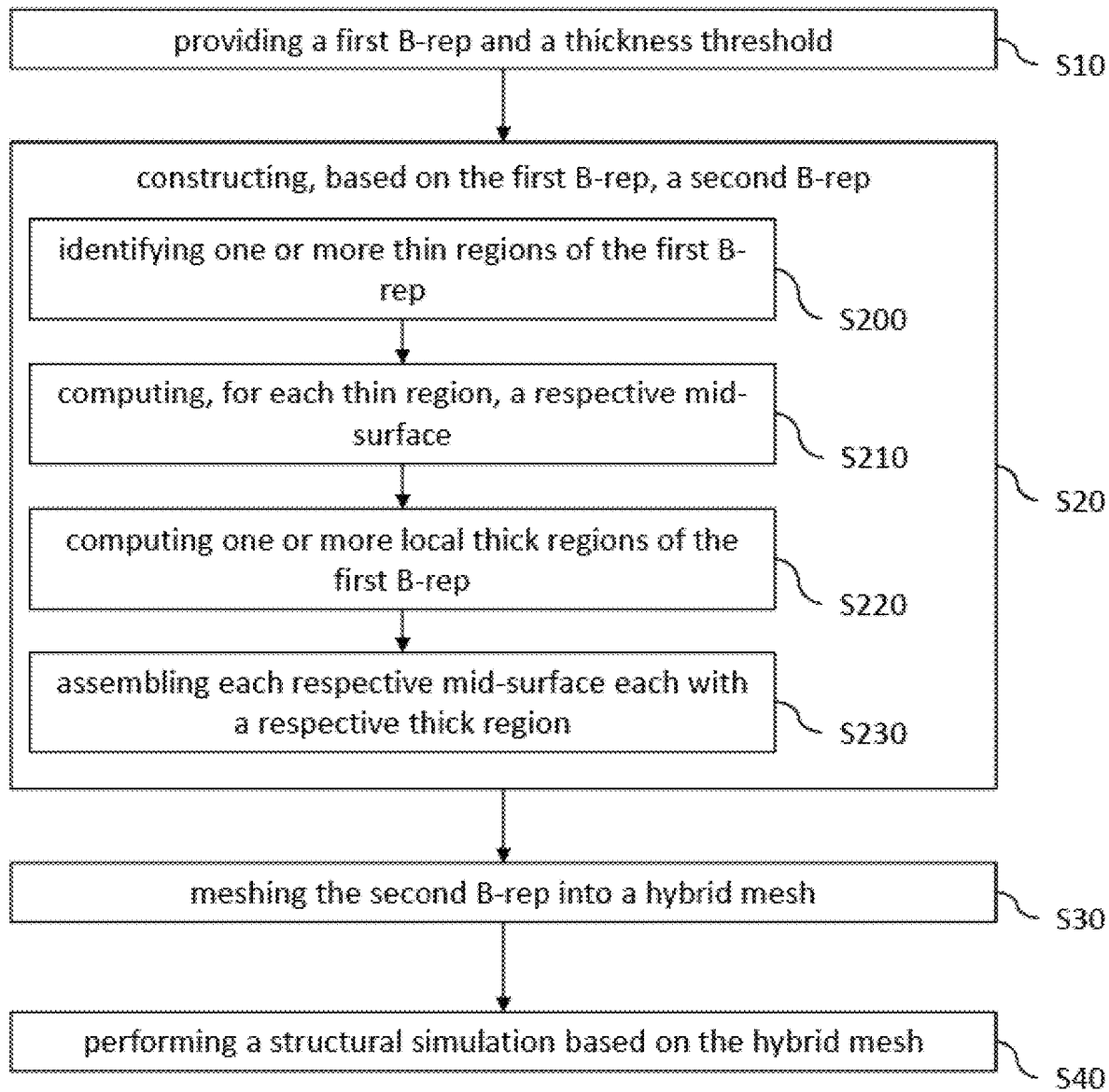
FIGS. 1 and 2 show flowcharts of examples of the method.

With reference to the flowchart of FIG. 1, it is proposed a computer-implemented method of B-rep processing for performing structural simulation of a mechanical part. The method comprises providing S10 a first B-rep. The first B-rep forms a solid representing the mechanical part. The method further comprises providing S10 a predetermined thickness threshold. The method further comprises constructing S20, based on the first B-rep, a second B-rep. The second B-rep forms a non-manifold object representing the mechanical part. The constructing S20 comprises identifying S200 one or more thin regions of the first B-rep. Each thin region has a thickness smaller than the predetermined thickness threshold. The constructing S20 further comprises computing S210, for each identified thin region, a respective mid-surface of the identified thin region. The constructing S20 further comprises replacing the identified thin region by the respective mid-surface.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates B-reps, which are modeled objects. A modeled object is any object defined by data stored e.g. In the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. Increases the speed at which designers statistically accomplish their task). This speeds up the manufacturing process in the industry, as the design of the products is part of the manufacturing process.

By PIM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systémes under the trademark DELMIA.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systémes under the trademark SIMULIA®. Another growing CAE technique involves the modeling and analysis of complex systems composed a plurality components from different fields of physics without CAD geometry data. CAE solutions allow the simulation and thus the optimization, the improvement and the validation of products to manufacture. Such CAE solutions are provided by Dassault Systémes under the trademark DYMOLA®.

PDM stands for Product Data Management. By PDM solution, it is meant any solution, software of hardware, adapted for managing all types of data related to a particular product A PDM solution may be used by all actors involved in the lifecycle of a product: primarily engineers but also including project managers, finance people, sales people and buyers. A PDM solution is generally based on a product-oriented database, it allows the actors to share consistent data on their products and therefore prevents actors from using divergent data. Such PDM solutions are provided by Dassault Systémes under the trademark ENOVIA®.

Figure 3:
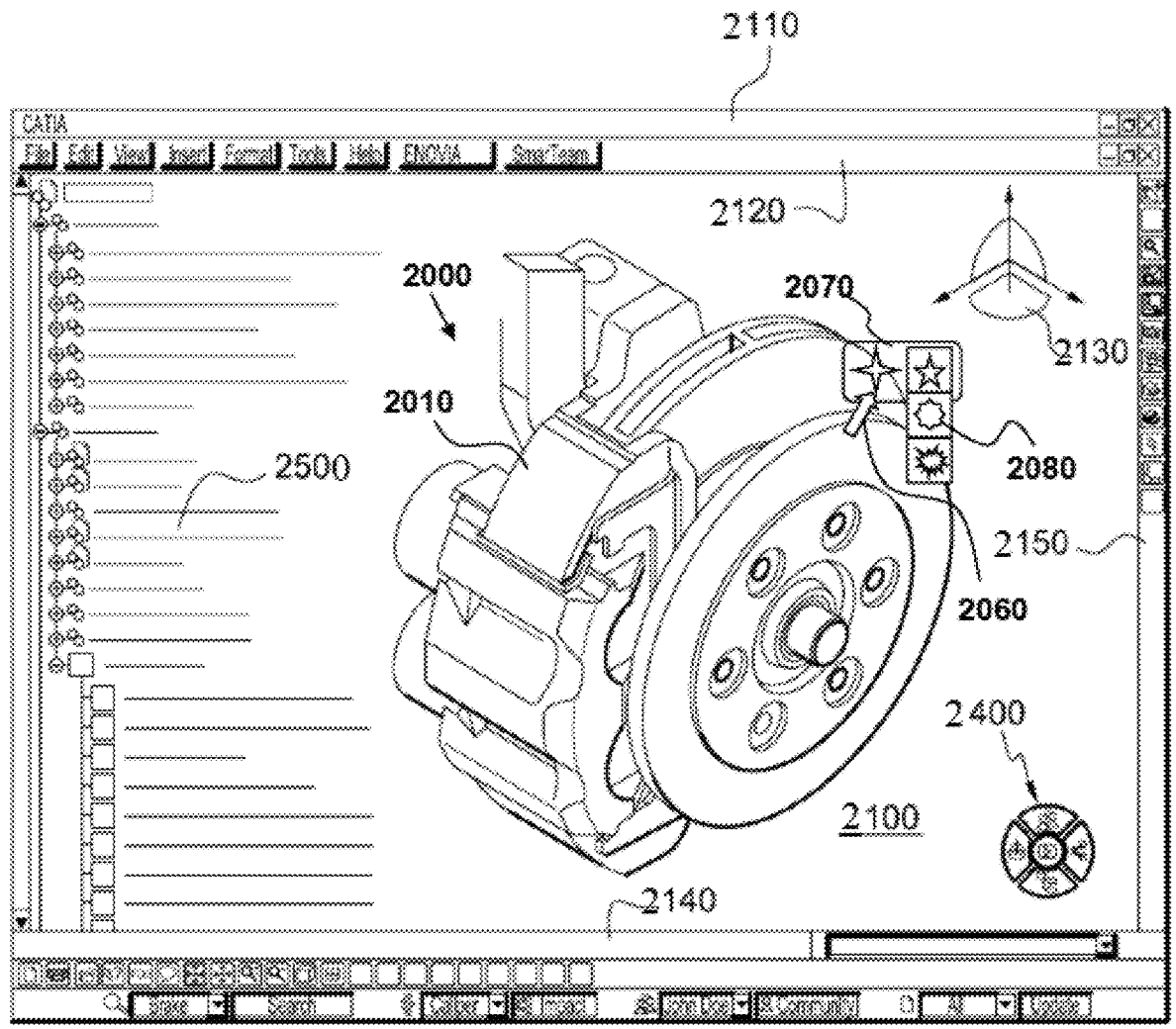
FIG. 3 shows an example of a graphical user interface of the system.

FIG. 3 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 4:
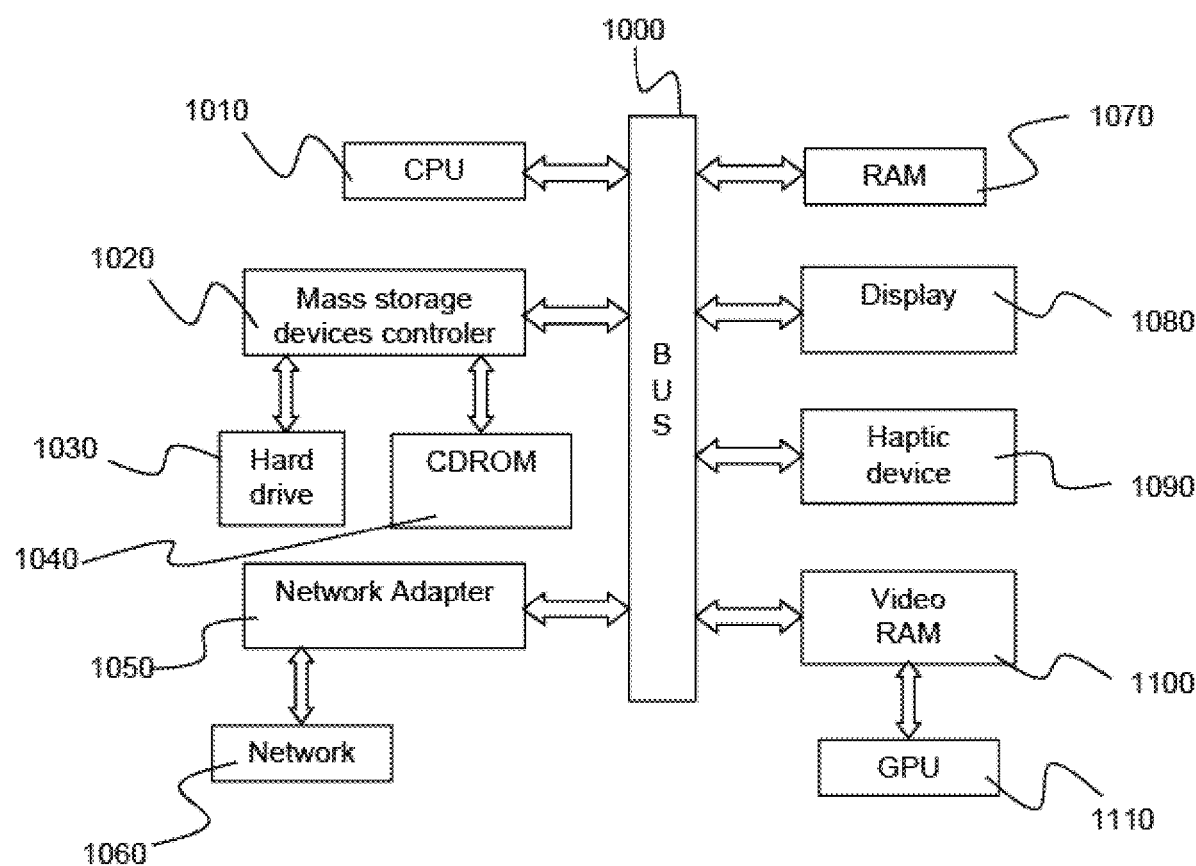
FIG. 4 shows an example of the system.

FIG. 4 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Any B-rep herein is a 3D modeled object that may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. Any B-rep herein may thus be a 3D modeled object representing an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (Including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

In the context of the method, the mechanical part (i.e. represented by the first and second B-reps) may be any mechanical part featuring thin walls as well as thick regions.

Figure 8:
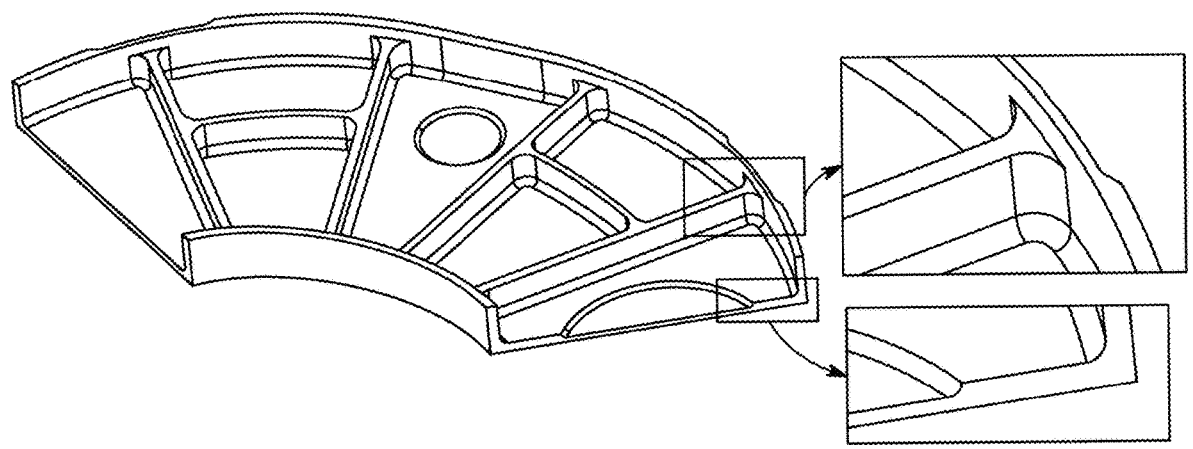

For example, the mechanical part may be an aerospace part, e.g. a cleat, a stringer, or a frame. FIG. 5 shows an example of the mechanical part, where the mechanical part is an aerospace cleat. FIG. 6 shows another example of the mechanical part, where the mechanical part is an aerospace cleat. FIG. 7 shows another example of the mechanical part, where the mechanical part is an aerospace stringer. FIG. 8 shows another example of the mechanical part, where the mechanical part is an aerospace frame.

Figure 9:
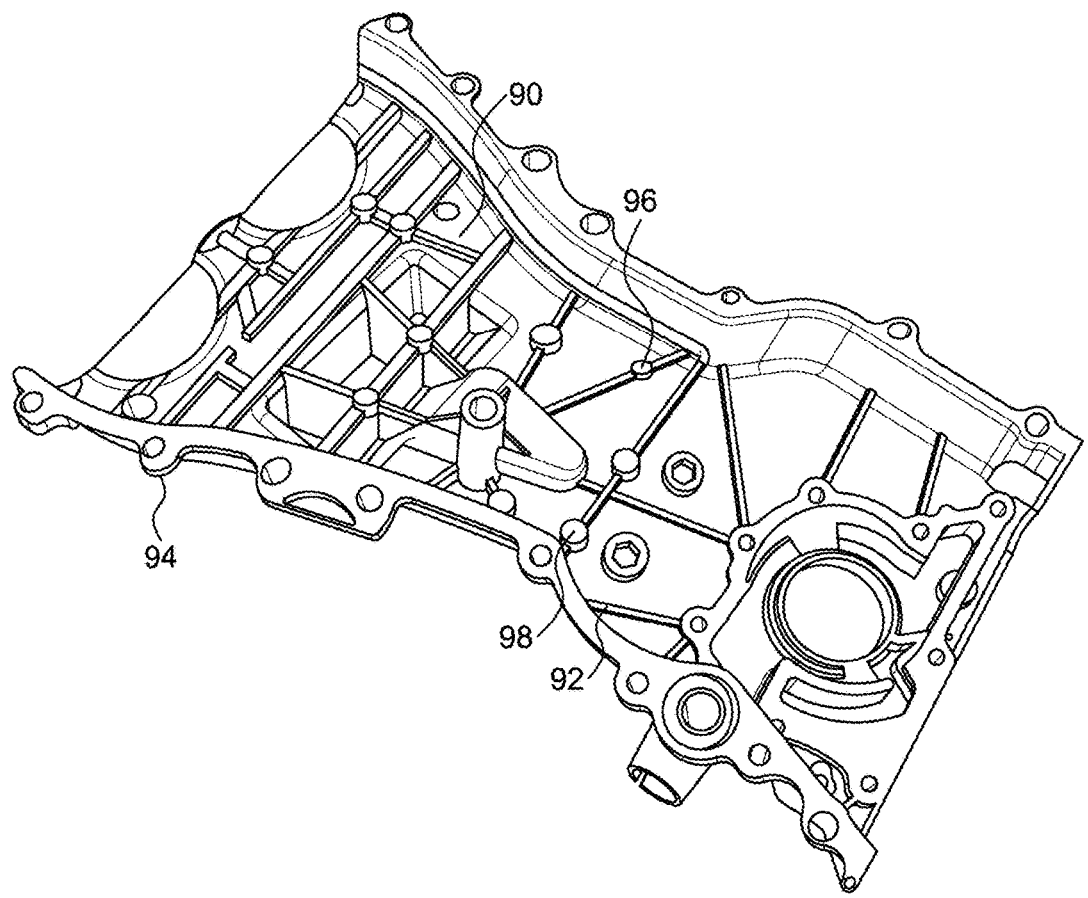

Alternatively or additionally, the mechanical part may be an automotive part, e.g. an automotive molded part. FIG. 9 shows an example of the mechanical part, where the mechanical part is an automotive molded part. This automotive molded part features thin walls for outer housing and inner stiffener, such as stiffeners 90 and 92, together with local thick apparatus, such as fixture 94, for fixture and manufacturing purpose. A typical manufacturing feature is the ejector pad, such as ejector pads 96 and 98, which is where the ejector pushes the part away from the mold, just after its opening.

Figure 10:
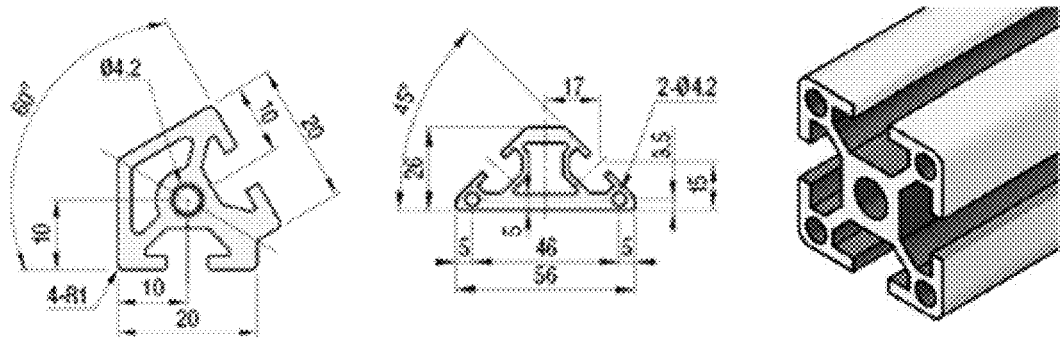

Additionally or alternatively, the mechanical part may be an aluminum extruded part for the automotive industry, the aerospace industry, the building design industry, or the ship design industry. FIG. 10 shows an example of the mechanical part, where the mechanical part is an aluminum extruded part. Such a part is typically based on a planar profile featuring thin and thick zones, which result in thin walls and thick volumes on the extruded solid, as shown in FIG. 10.

The method may comprise, as an initial stage, designing a 3D modeled object (i.e. the first B-rep) representing the mechanical part. "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the second B-rep. The producing may be performed after a structural simulation based on the second B-rep, as earlier-mentioned and later-described. In any case, the second B-rep constructed by the method may represent a manufacturing object. The manufacturing object may be a product, such as a part, or an assembly of parts. Because the method improves the construction of the second B-rep and allows the performing of fast and accurate structural simulation, the method also improves the manufacturing of a product and thus increases productivity of the manufacturing process.

The method is for B-rep processing. B-rep processing designates any action or series of action for modifying a B-rep. In the case of the method, the B-rep processing comprises providing S10 the first B-rep and constructing the second B-rep based on the second B-rep. Before further discussing the B-rep processing that the method performs, B-rep concepts involved in the method are now discussed with reference to FIGS. 11 to 32.

B-Rep model includes topological entities and geometrical entities. Topological entities are: face, edge, and vertex. Geometrical entities are 3D objects: surface, plane, curve, tine, point. By definition, a face is a bounded portion of a surface, named the supporting surface. An edge is a bounded portion of a curve, named the supporting curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex.

Figure 11:
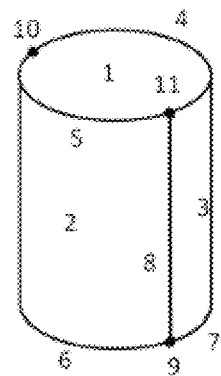
Figure 12:
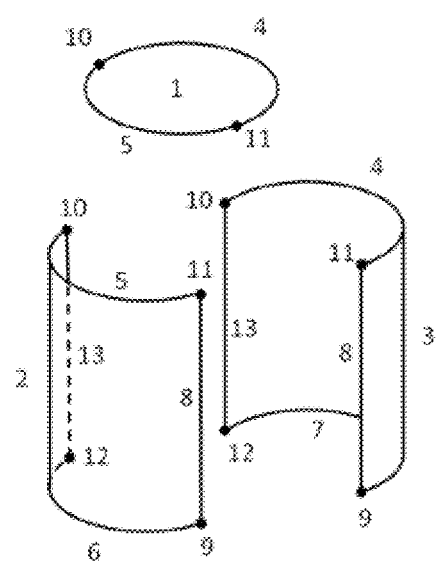

FIGS. 11 and 12 illustrate the B-Rep model of a cylindrical slot made of three faces: top planar face and two lateral cylindrical faces. FIG. 11 shows the perspective view of the slot. Visible faces, edges and vertices are numbered. FIG. 12 shows the exploded view of all faces. Duplicated numbers illustrate edges and vertices sharing. Face 1 is a bounded portion of a plane. Boundary of face one includes edges 4 and 5, each of them being bounded by vertices 10 and 11. They both have the same supporting circle. Face 2 is bounded by edges 6, 8, 5 and 13 all lying on an infinite cylindrical surface. Faces 1 and 2 are adjacent because they share edge 5. Faces 2 and 3 are adjacent because they share edges 8 and 13. Faces 1 and 3 are adjacent because they share edge 4.

FIG. 13 illustrates the "is bounded by" topological relationship of the B-Rep model. Nodes of higher layer are faces, nodes of intermediate layer are edges and nodes of lower layer are vertices. FIGS. 14 and 15 illustrate the relationship between topological entities (faces, edges, vertices), as shown in FIG. 14 and the supporting geometries (infinite cylinder, infinite plane, infinite line, points), as shown in FIG. 15. In a CAD system, e.g. performing the method, the B-Rep model gathers in an appropriate data structure the "is bounded by" relationship, the relationship between topological entities and supporting geometries, and mathematical descriptions of supporting geometries.

Figure 17:
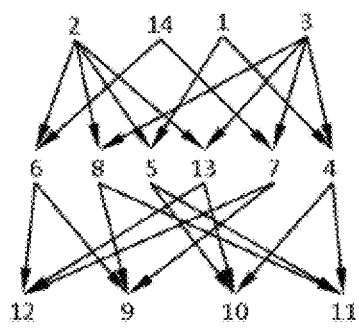

By definition, an internal edge of a B-Rep is shared by exactly two faces. The faces sharing the edge are said to be incident to each other, or incident to the shared edge. By definition, a boundary edge is not shared, it bounds only one face. By definition, a boundary face is incident to at least one boundary edge. A B-Rep is said to be closed if all its edges are internal edges. A B-Rep Is said to be open if it includes at least one boundary edge. The B-Rep of previous example is open because edges 6 and 7 are boundary edges. Conversely, edges 4, 5, 8 and 13 are internal edges. A closed B-Rep is obtained from the B-rep shown in FIGS. 11 and 12 by adding disk-like face 14 bounded by edges 6 and 7 as illustrated in FIGS. 16 and 17. A closed B-Rep is used to model a thick 3D volume because it defines the inside portion of space (virtually) enclosing material. An open B-Rep Is used to model a 3D skin, which is a 3D object the thickness of which is sufficiently small to be neglected.

Figure 18:
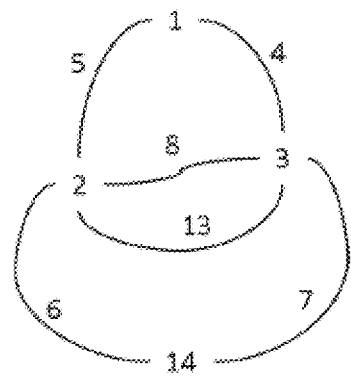

The dual graph of the B-Rep is a logical graph that captures faces adjacencies only. It is defined as follows. Nodes of the dual graph are associated with faces of the B-Rep and arcs of the dual graph are associated with edges of the B-Rep. An arc of the dual graph connects two nodes of the dual graph if the B-Rep edge associated with the arc is shared by the B-Rep faces respectively associates with nodes. For example, the dual graph of the cylindrical B-Rep in FIG. 16 is shown in FIG. 18. Arcs are labeled with edges numbers.

Figure 19:
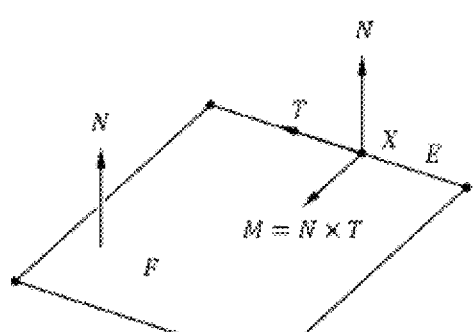
Figure 20:
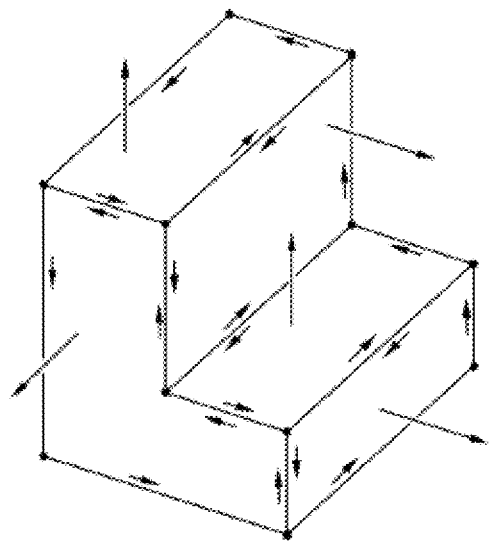

Each face of the B-Rep Is equipped with a normal vector, defined with the help of the supporting surface. Firstly, the normal vector is collinear with the normal vector of the supporting surface. In addition, the normal vector of a closed B-Rep modeling a solid is directed outside the material. Let F be a face of the B-Rep and N its outer normal vector. Let E be an edge of face F, X a point on edge E and T the normalized tangent vector of edge E at point X. By definition, edge E is oriented counterclockwise if vector $M = N \times T$ is directed toward the inside region of the face, as illustrated by FIG. 19. Notice that since vectors N and T are normalized and perpendicular, then vector M is normalized. By convention, all edges of all faces of a B-Rep are oriented counterclockwise, as illustrated on FIG. 20.

Figure 21:
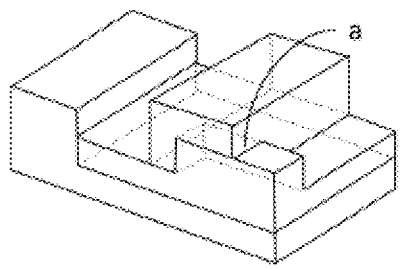
Figure 22:
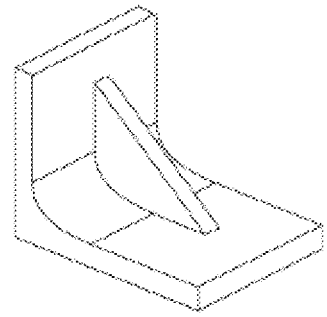
Figure 23:
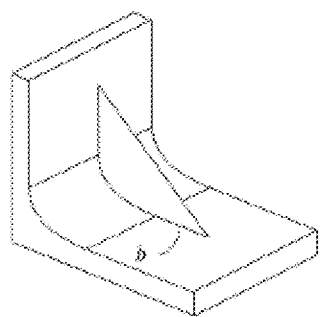

From the mathematical point of view, the standard B-Rep of a solid is used to represent manifold objects, meaning that, locally, the B-Rep cuts the neighboring space in exactly two portions: the inside of the solid and the outside of the sold. Despite this property is well adapted to real life manufactured objects, it falls to represent useful configurations, like multi-material objects or local approximation. For example, FIG. 21 shows a solid made of several layers of different materials. The interface separating materials is made of faces shared by adjacent regions. FIG. 22 shows a traditional B-Rep of a part featuring a stiffener. FIG. 23 shows the stiffener approximated by a surface, while the neighboring part is a volume, which turns out to be a mixed surface/volume object.

Figure 24:
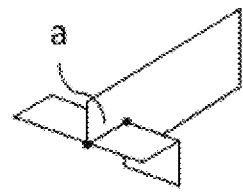
Figure 25:
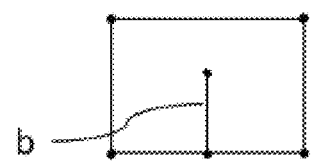

Non-manifold topology allows a coherent model to support these situations. By reusing and extending the B-Rep data structure, it captures edges shared by more than two faces, as illustrated in FIG. 24. It captures a boundary edge as well inside its bounded face, meaning that it does not separate material of the face, as illustrated in FIG. 25.

Figure 26:
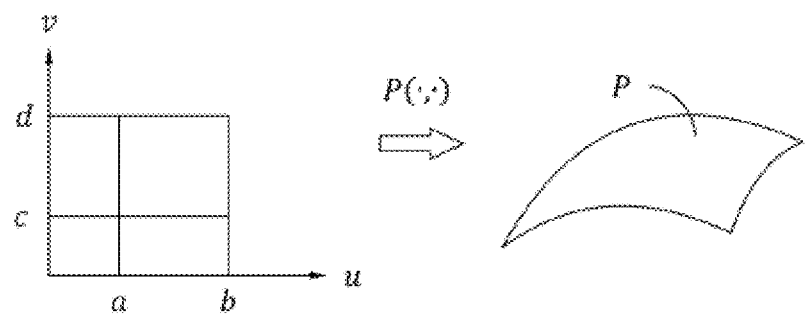
Figure 27:
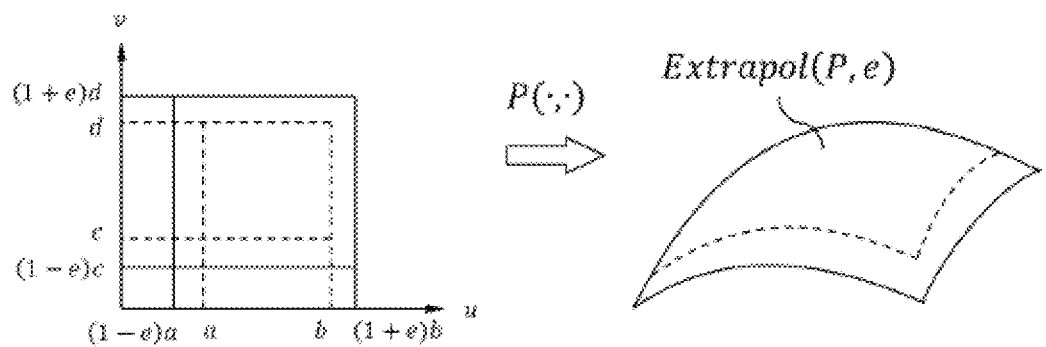
Figure 28:
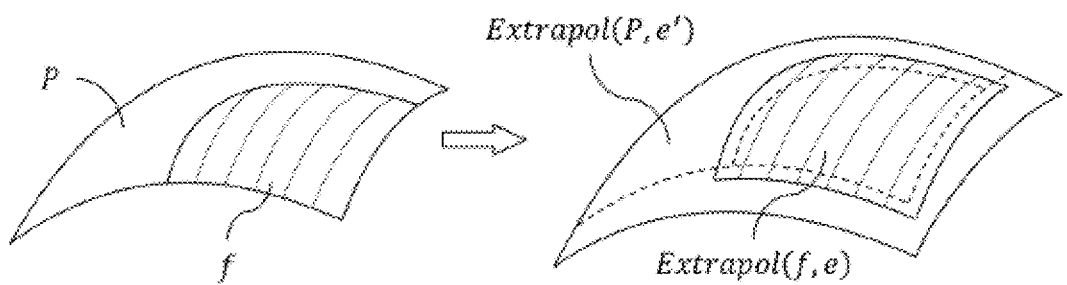

The method, as further discussed hereinafter, may use face extrapolation and surface extrapolation. By definition, a surface is a smooth mapping $P:[a,b]\times[c,d]\to \mathbb{R}^3$ with $(u,v)\to P(u,v)$. Various models are available for computing point $P(u,v)$ from parameters $(u,v)$, for example Bezier, B-Spline, NURBS, or trigonometric. FIG. 26 illustrates the surface as the image of the parameter domain. In the context of the present disclosure, the extrapolation process is to extend the domain $[a,b]\times[c,d]$, meaning that $[a,b]\times[c,d]$ is changed into $[(1-e)a,(1+e)b]\times[(1-e)c,(1+e)d]$ where $e>0$ Is the extrapolation coefficient. If the mapping P is curvature continuous, this process yields a curvature continuous extrapolated surface. In the context of the present disclosure, the extrapolation parameter may be $e=0.01$. FIG. 27 illustrates the extrapolation effect; dotted lines are the shape before extrapolation. Extrapolating a face is to extrapolate its supporting surface and to replace the face's boundary curve by an offset boundary curve based on the extrapolated supporting surface. The extrapolation of the supporting surface is wide enough to enclose the face's boundary curve offset. FIG. 28 illustrates the extrapolation of face f defined on supporting surface P. Supporting surface P is extrapolated with $e'>e$ so that extrapolated face Extrapol(f,e) can be defined on the wider supporting surface Extrapol(P,e').

Figure 29:
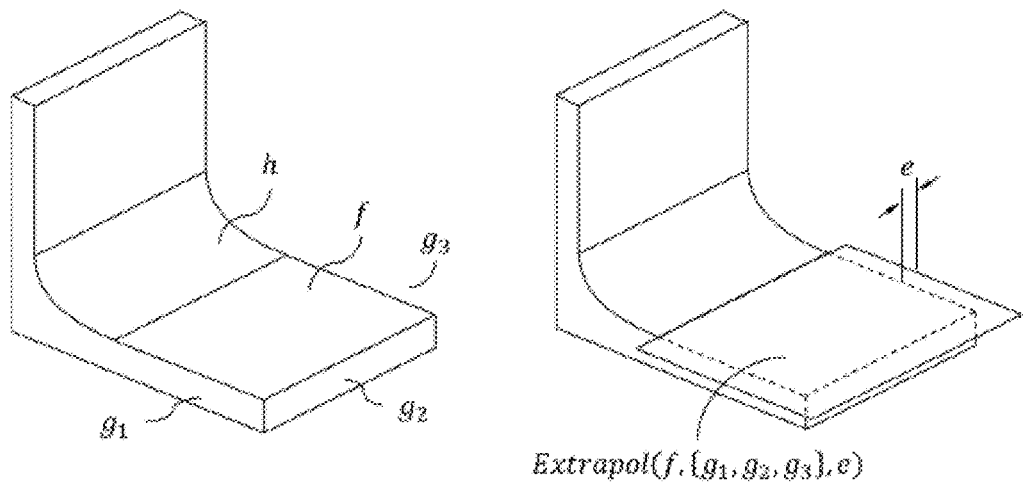

The method may use a more specific extrapolation operation of faces. The inputs of this operation are: the face f to extrapolate, the extrapolation parameter e and a list of faces $L=\{g_k, k=1, 2, \ldots\}$. The specific extrapolation is to only offset the boundary edges of face f that are shared with a face in list L. FIG. 29 illustrates the specific extrapolation of face f according to faces $\{g_1,g_2,g_3\}$. Notice that the edge of face f shared with the fillet face h is not involved in the extrapolation because face h is not in list $\{g_1,g_2,g_3\}$.

The method may in examples use the concept of local parallelism of two faces for identifying thin regions of the first B-Rep. Two preliminary definitions are discussed before discussing this concept: offsetting a face and thickening a face. It should be noted that the outer orientation of normal vectors is explicitly involved. Given a face f of the B-Rep and a non-negative number $\lambda$, the offsetting operation is to compute the object Offset(f,$\lambda$), which is the face parallel to face f at distance $\lambda$. Noting $N_f(x)$ the outer normal vector at point x of face f, it is defined by:

$$\mathrm{Offset}(f,\lambda)=\{x-\lambda N_f(x), x\in f\}.$$

Figure 30:
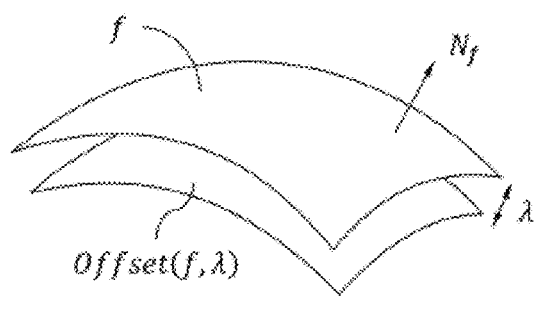

The offsetting operation is illustrated by FIG. 30. The thickening operation is to compute the object Thick(f,$\lambda$), which is the volume enclosed by face f and its offset face at distance $\lambda$. It is defined by:

$$\mathrm{Thick}(f,\lambda)=\{x-sN_f(x), x\in f, s\in[0,\lambda]\}.$$

Figure 31:
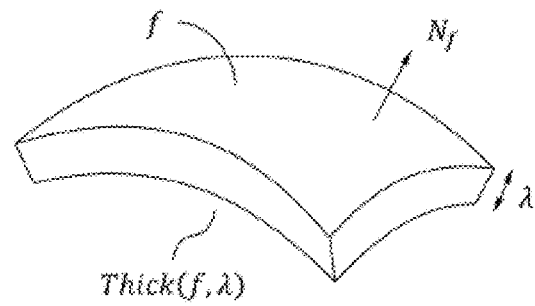

FIG. 31 illustrate the thickening operation.

The definitions of parallelism and local parallelism are now given. Two faces f and g are parallel at distance $\lambda$ if for each point $x\in f$, the point $x-\lambda N_f(x)$ in on face g and if for each point $y\in g$, the point $y-\lambda N_g(y)$ is on face f. In the context of the present disclosure, the concept of local parallelism is used. Two faces f and g are locally parallel if exists $\lambda>0$ such that face g∩Thick(f,$\lambda$) and face f∩Thick (g,$\lambda$) are parallel at some distance. Local parallelism is illustrated on FIG. 32. Bold lines represent the respective portions of faces f and g that are parallel, thus making faces f and g locally parallel.

Referring back to the flowchart of FIG. 1, the method comprises providing S10 a first B-rep. The first B-rep is a solid representing the mechanical part. In other words, the first B-rep is a closed B-rep. Providing S10 the first B-rep may comprise creating the first B-rep, i.e. designing a 3D modeled object forming the first B-rep, as previously discussed. Alternatively, providing S10 the first B-rep may comprise retrieving the first B-rep from a (e.g. distant) memory where it has been stored after its creation. Providing S10 the first B-rep may comprise displaying the first B-rep.

Still referring to the flowchart of FIG. 1, the method further comprises providing S10 a predetermined thickness threshold. The thickness threshold is a value of a thickness, for example a strictly positive real number. The providing S10 of the predetermined thickness threshold may comprise, by a user, selecting the thickness threshold, e.g. and then feeding it as input to the constructing S20. The user may select the thickness threshold by defining its value, e.g. based on mechanical/structural consideration on the mechanical part. For example, the user may determine the thickness threshold in such a way that any region of the mechanical part having a thickness lower than the thickness threshold is a region which, for structural and/or mechanical and/or manufacturing considerations, can be approximated well by a mid-surface.

Still referring to the flowchart of FIG. 1, the method further comprises constructing S20, based on the first B-rep, a second B-rep. By "based on the first B-rep", it is meant that the construction takes as input the first B-rep and outputs the constructed second B-rep, the construction of the second B-rep taking into account the first B-rep and the thickness threshold. In other words, the second B-rep is obtained from the first B-rep. The second B-rep forms a non-manifold object, i.e. has a non-manifold topology. In other words, the second B-rep is not a closed B-rep and comprises both solid closed volume regions and surface regions. The second B-rep yet represents the mechanical part, but with mid-surfaces, instead of volumes, for representing thin regions of the mechanical part, as previously discussed and as further discussed hereinafter. The constructing S20 may be performed automatically (e.g. by a CAD system with which the method is carried out), e.g. subsequent to the completion of the providing S10. This means that the method may construct the second B-rep automatically, which makes the method efficient.

Still referring to the flowchart of FIG. 1, the constructing of the second B-rep comprises Identifying S200 one or more thin regions of the first B-rep. The identifying S200 of the one or more thin regions Is now discussed.

Each thin region is a volume bounded by faces of the first B-rep and having a thickness smaller than the thickness threshold. The thickness threshold is for that an input of the constructing S20 for use by the Identifying S200. The Identifying S200 of the one or more thin regions may comprise exploring faces of the first B-rep and detecting groups of faces each bounding partially a region having a thickness smaller than the thickness threshold. The Identifying S200 may further comprise pairing such groups into first and second groups, such that the first and second groups of each pair form boundary parts of a thin region which are locally parallel to one another.

Examples of the identifying S200 are now discussed with reference to the flowchart of FIG. 2, which shows a flowchart of an example of the Identifying S200 of the one or more thin regions.

In examples, the Identifying S200 of the one or more thin regions comprises determining first and second groups each of one or more adjacent and tangent faces of the first B-rep. Each first group Is locally parallel to a respective second group and forms with the respective second group at least a part of a boundary of a thin region.

As previously discussed, two faces of the first B-rep are adjacent when they share an edge of the first B-rep. The two faces are tangent when the angle between normal vectors along the shared edges is under the G1 continuity tolerance angle, which is discussed hereinafter. The method determines first and second such groups, for example by determining the faces of each group. Each determined first group forms a part of the boundary of one of the thin regions, the determined second group locally parallel to the first group forming another part of the boundary of the thin region. Said part and said another part are locally parallel. Indeed, the first group is locally parallel to the second group. The two groups are separated by a distance lower than the thickness threshold. Determining such a first and second groups allows to Identify efficiently the thin region by only detecting a portion of its boundary (namely the portion made of first and second groups). Furthermore, this allows to compute a mid-surface of the thin region, as further discussed hereinafter.

Figure 2:
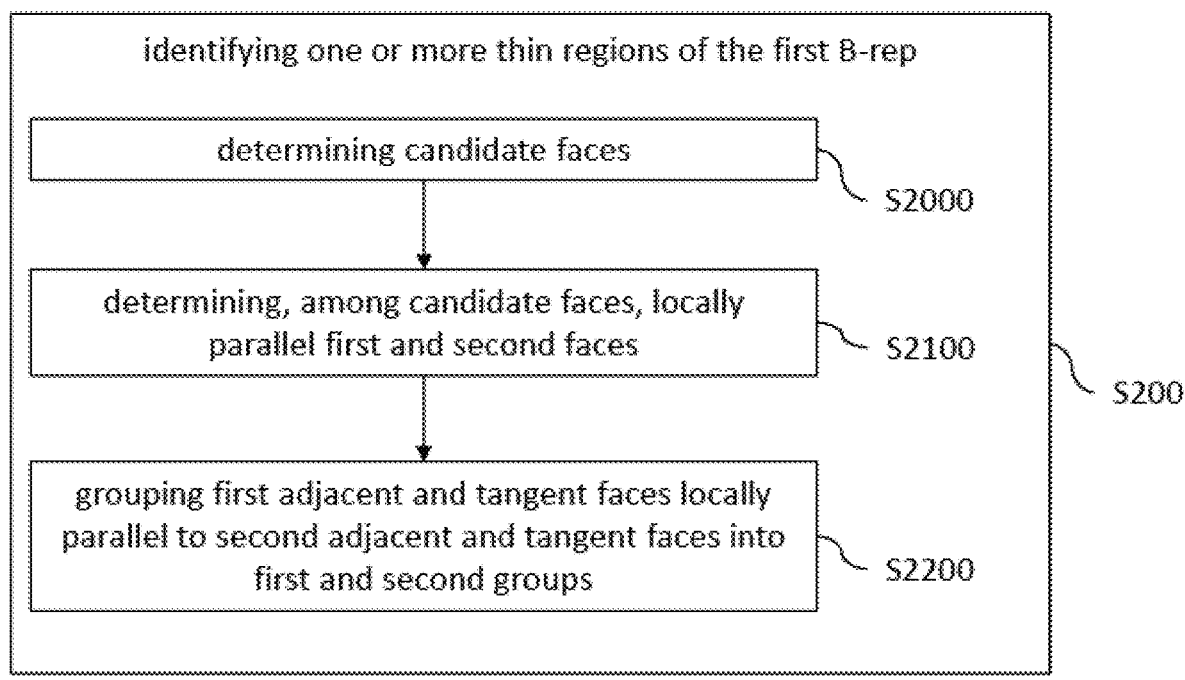

Referring to the flowchart of FIG. 2, the determining of the first and second groups may in examples comprise determining faces of the first B-rep each locally parallel to a respective other face. In other words, the determining of the first and second groups comprises in these examples determining locally parallel first and second faces. In these examples, the determining of the first and second groups further comprises grouping S2200 first determined adjacent and tangent faces locally parallel to second determined adjacent and tangent faces into first and second groups.

Determining locally parallel first and second faces improves speed and efficiency of the method. Indeed, thereby the faces of the first and second groups need not be identified all at once, which could be cumbersome. Rather, the method determines couples each made of a first face (I.e. of a first group) and a second face locally parallel to the first face (i.e. the second face belongs to the second group locally parallel to the first group). The method then groups S2200 the determined couples to form first and second groups.

Determining a first face locally parallel to the second face may comprise verifying that the first face is locally parallel to the second face. For example, the method may explore faces of the first B-rep and performs such a verifying for couples of explored faces.

Still referring to the flowchart of FIG. 2, in examples, the determining of the faces comprises determining S2000 candidate faces. A candidate face is a first face of the first B-rep of which a point is at a distance lower than the thickness threshold from a second face of the first B-rep. In these examples, the determining of the faces further comprises determining S2100, among candidate faces, first and second faces. Each first face is locally parallel to a respective second face.

This improves the determining of the faces, as in these examples, this determining proceeds in two steps. First, couples of candidate faces are determined. Then, only a subset of these couples is kept for forming the determined faces to be then grouped S2200 into first and second groups. This two-steps approach improves robustness.

Determining S2000 the candidate faces may comprise exploring the faces of the first B-rep and finding each couple made of a first face and a second face and which is such that the first face has a point at a distance lower than the thickness threshold from the second face. The first face may be referred to as "the first candidate face" and the second face may be referred to as "the second candidate face". The couple may be referred to as "a couple of candidate faces". Finding the couple may comprise exploring the first face and detecting at least one second face located at a distance lower than the thickness threshold from at least one point of the first face. It is to be understood that several such second faces may be detected, each at a distance lower than the thickness threshold lower than a respective point of the first face. In such a case, the first face is a candidate face forming couples of candidate faces each with a respective second face.

Determining S2000 the candidate faces allows to determine each couple of faces of the first B-rep consisting in a first face and a second face, the first face being potentially parallel to the second face. It remains then to determine S2100, among the candidate faces, the first and second faces which are truly locally parallel to complete the determining of the faces. This makes the method robust and efficient.

Detecting the at least one second face may comprise:
sampling the first face into sampled points; and
for each sampled point, casting a ray from the sampled point, and, if and once the casted ray Intersects another face of the first B-rep at a distance lower than the thickness threshold, detecting the another face as a second face forming with the first face a couple of candidate faces.

Determining, among candidate faces, locally parallel first and second faces may comprise, for each couple of candidate faces, verifying that the faces of the couples are locally parallel, for example by verifying that they satisfy the previously-discussed definition of local parallelism. If the faces of the couples are parallel, then they are determined as a couple made of a first face locally parallel to the second face.

In examples, two faces are locally parallel when:
a ratio between a largest distance between the faces and a smallest distance between the faces is lower than one plus a threshold; and/or
a ratio between the difference between a largest distance between the faces and a smallest distance between the faces and at least one of the faces' diagonal length is lower than a tangent of a G1 continuity tolerance angle.

The diagonal length of a face may be defined as the maximal distance between two points of the face, the distance being any suitable distance between points such as a Euclidean distance.

In other words, verifying that two faces are locally parallel may comprise:
verifying that a ratio between a largest distance between the faces and a smallest distance between the faces is lower than one plus a threshold; and/or
verifying that a ratio between the difference between a largest distance between the faces and a smallest distance between the faces and at least one of the faces' diagonal length is lower than a tangent of a G1 continuity tolerance angle.

Verifying that a ratio between a largest distance between the faces and a smallest distance between the faces is lower than one plus a threshold allows to verify relatively rigorously the geometrical local parallelism of the faces from the geometrical point of view. The threshold may be a small positive real number, for example smaller than 1, 0.5 or 0.2, e.g. equal to 0.1. Verifying that a ratio between a largest distance between the faces and a smallest distance between the faces is lower than one plus a threshold may comprise:
- sampling the faces into sampled points;
- for each face of the faces, projecting each sampled point of the face on the other face;
- computing each (e.g. Euclidean) distance between a sampled point of one of the faces and its projection on the other face, computing a largest distance and a smallest distance among such distances, and verifying that a ratio between the largest distance and the smallest distance Is lower than one plus the threshold; and
- computing each (e.g. Euclidean) distance between a sampled point of said other face and its projection on said face, computing a largest distance and a smallest distance among such distances, and verifying that a ratio between the largest distance and the smallest distance is lower than one plus the threshold.

Verifying that a ratio between the difference between a largest distance between the faces and a smallest distance between the faces and at least one of the faces' diagonal length is lower than a tangent of a G1 continuity tolerance angle allows to verify the local parallelism of the faces from a manufacturing practical point of view. Indeed, G1 continuity corresponds to the engineering fillet continuity. So ensuring that the angle between two locally parallel faces is under this tolerance makes the notion consistent with the general manufacturing constraints. The concept of G1 continuity is known per se in mechanical design. Verifying that a ratio between the difference between a largest distance between the faces and a smallest distance between the faces and at least one of the faces' diagonal length is lower than a tangent of a G1 continuity tolerance angle may comprise:
- sampling the faces Into sampled points;
- for each face of the faces, projecting each sampled point of the face on the other face;
- computing each (e.g. Euclidean) distance between a sampled point of one of the faces and its projection on the other face, computing a largest distance and a smallest distance among such distances, verifying that a ratio between the difference between the largest distance and the smallest distance and said face diagonal length is lower than the tangent of the G1 continuity tolerance angle; and
- computing each (e.g. Euclidean) distance between a sampled point of said other face and Its projection on said face, computing a largest distance and a smallest distance among such distances, and verifying that a ratio between the difference between the largest distance and the smallest distance and said other face diagonal length Is lower than the tangent of the G1 continuity tolerance angle.

Verifying that both a ratio between a largest distance between the faces and a smallest distance between the faces is lower than one plus a threshold and a ratio between a difference between a largest distance between the faces and a smallest distance between the faces and each face's diagonal length is lower than a tangent of a G1 continuity tolerance angle Improves efficiency and robustness of the verifying.

Still referring to the flowchart of FIG. 2, the grouping S2200 may be carried out by any known method suitable for grouping determined locally parallel first and second faces Into the first and second groups. The grouping may in examples comprise Identifying, e.g. based on a dual graph of the first B-rep, adjacency and tangency between, on one side, determined first faces, and on the other side, determined second faces each parallel to a determined first face.

Referring back to the flowchart of FIG. 1, the method further comprises computing S210, for each identified thin region, a respective mid-surface of the identified thin region. As previously discussed, the thin region is a thin solid portion of the first B-rep. The mid-surface of a solid portion of a B-rep is a known concept, and computing S210 the respective mid-surface may be done by any known method.

In examples where the identifying S200 of the one or more thin regions comprises the previously-discussed determining of the first and second groups, the computing S210 of a respective mid-surface for each identified thin region may comprise, for each determined first group locally parallel to a determined respective second group, computing, as a mid-surface, an Intersection between a result of a first thickening operation of the first group and a result of an offset operation of the respective second group.

Computing the intersection between the result of the first thickening operation of the first group and the result of the offset operation of the respective second group may comprise computing the first thickening operation and the offset operation, and then determining the intersection of the respective results of these operations. This is an efficient and simple manner of computing the mid-surface. The parameters of these operations may be fixed, e.g. as parameters of the computing S20, such that the intersection results in the respective mid-surface. For example, the thickening distance of the thickening operation may be larger than the thickness threshold but relatively close to it, for example equal to 1.1 times the thickness threshold. The offset distance of the offset operation may be of the order of the thickening distance divided by 2, for example equal to the thickness threshold divided by 2.

The offset operation may be an offset of an extrapolation of the respective second group. This allows to compute safely the intersection, because the boundary curve of the result of the extrapolation (which is a group of faces extrapolated from the respective second group) is away from the boundary curve of the result of the first thickening operation. The extrapolation may have an extrapolation value equal to 0.001 times a value which is a representative dimension of the first B-rep. Additionally or alternatively, the first thickening operation has a thickening distance larger than the thickness threshold, e.g. equal to 1.1 times the thickness threshold. This makes the Intersection reliable, by avoiding a tangency configurations when computing the Intersection. In examples, the offset operation may be an offset of an extrapolation of the respective second group and the first thickening operation has a thickening distance larger than the thickness threshold, e.g. equal to 1.1 times the thickness threshold. This Improves robustness of the computing S210 of the respective mid-surface.

Still referring to the flowchart of FIG. 1, in examples, the constructing S20 further comprises computing S220 one or more local thick regions of the first B-rep. The computing S220 of the one or more thick regions comprises, for each determined first group locally parallel to a determined respective second group, computing an intersection of a result of a second thickening operation of the first group and a result of a third thickening operation of the respective second group. The computing S220 of the one or more thick regions further comprises subtracting from the first B-rep each computed Intersection.

The computing of the intersection of the result of a second thickening operation of the first group and the result of a third thickening operation of the respective second group may comprise computing the second thickening operation and the third thickening operation, and then computing the intersection of their results. The computing of the intersection is such that each such computed Intersection is a thin wall of the first B-rep which substantially corresponds to one of the respective identified thin region(s). Notably, the thickening distance of both the third and second thickening operations may be of the order of the thickness threshold, for example equal to the thickness threshold times 1.1.

The second thickening operation of the first group may be a thickening of an extrapolation of the first group. In such a case, additionally, the third thickening operation of the respective second group is a thickening of an extrapolation of the respective second group. Also, the extrapolation of the first group and the extrapolation of the respective second group have in this case different extrapolation values. For example, the extrapolation of the first group may have an extrapolation value equal to 0.01 times the representative dimension of the first B-rep, and the extrapolation of the second group may have an extrapolation value equal to 2 times 0.01 times the representative dimension of the first B-rep. This avoids overlapping of lateral faces of the results of the second and third thickening operations. Additionally or alternatively, the third thickening operation and the second thickening operation may have each a thickening distance larger than the thickness threshold. This makes the intersection reliable because the offset of the first group, which bounds the result of the second thickening operation, is away from the faces bounding the result of the third thickening operation. Furthermore, bounding faces of these results share respective supporting faces.

Subtracting from the first B-rep each computed intersection amounts to trim thin walls from the first B-rep. This may be carried out by computing the union of the computed thin walls, and then subtracting this union from the first B-rep. Thereby, it remains from this subtraction only the local thick regions of the first B-rep. I.e, the regions having a thickness larger than the thickness threshold.

The method further comprises replacing the identified thin region by the respective mid-surface. This may comprise trimming the thin region from the first B-rep and assembling the mid-surface to the first B-rep in replacement of the trimmed thin region.

Still referring to the flowchart of FIG. 1, the replacing may comprise assembling S230 the respective mid-surface with a respective computed thick region. The assembling is carried out by assembling a boundary edge of the respective mid-surface with a splitting edge of the respective computed thick region. This facilitates the meshing of the second B-rep.

An algorithm implementing constructing S20 is now discussed. The constructing S20 of the second B-rep may be carried out, in examples of the method, by executing this algorithm, which comprises five steps.

The input data of the algorithm are the first B-rep S (also referred to as the solid S) and a user defined thickness threshold t>0. In other words, the providing S10 comprises providing S10 the first B-rep and, by a user, providing S10 t. The output data of the algorithm Is the second B-rep, i.e. a non-manifold object made of adjacent volumes and faces. The algorithm includes five steps. For simplicity, boundary faces of solid S are numbered $f_i$ for $f=1, \ldots, n$.

Step 1. Identifying S200 One or More Thin Regions
Step 1.1. Couples of Candidate Locally Parallel Faces The purpose of step 1 is to Identify all couples $(f_i,f_j)$ of locally parallel faces within solid S. Couples are arranged in such a way that j>i. The algorithm makes use of an intersection operation. Given a face $f_i$ and a point $x \in f_i$, the function Intersect($f_i,x,f_j,y$) finds face $f_j$ of the solid and point $y \in f_j$ and $y=x-\lambda N_{f_i}(x)$ where $\lambda>0$ is the smallest possible value and is smaller than the thickness threshold. This function Is illustrated on FIG. 33.

If point y and face $f_j$ exist, function Intersect($f_i,x,f_j,y$) returns "true". If point y and face $f_j$ do not exist, function Intersect($f_i,x,f_j,y$) returns "false". The first loop yields a table $T(p)=(f_{i_p},f_{j_p},d_p)$ for $p=1, 2, \ldots$ of candidate locally parallel faces.

```
p:=0
For i=1, ..., n do begin
    Get a sampling {x_k,k=1, ..., m(i)} of face f_i.
    For k=1, ..., m(i) do begin
        If Intersect(f_i,x_k,f_j,y)=true then
            p:=p+1
            T(p):=(f_i,f_j,||y−x_k||)
        End if
    End for
End for
p_max:=p
T(p_max+1)=(0,0,0)
```

Previous Instruction is to avoid side effect during the scan explained in the following. Table T features repeated and arbitrarily arranged couples of potentially locally parallel faces together with distances. Elements of table T(•) are addressed as follows: T(i) is the i-th line of the table. It is made of a triple T(i)=(f,g,d) where f and g are face Identifiers and d Is a distance. Then, element f is addressed by T(1,i), element g Is addressed by T(2,i) and element d is addressed by T(3,i). Table T is now sorted according to lexicographic order. This means that if p'>p then T(1,p')>T(1,p) or, if T(1,p')=T(1,p) then T(2,p')>T(2,p) or, if T(2,p')=T(2,p) then T(3,p')≥T(3,p). In particular, this makes all Identical couple of faces consecutive. This way, through a linear scanning, it Is possible to Identify all couples of candidate locally parallel faces, which are stored in the output table C (•).

```
p:=0
For i=1, ..., p_max do begin
    if (T(1,i+1),T(2,i+1))≠(T(1,i),T(2,i)) then
        If T(3,i)≠t then
            p:=p+1
            C(p):=(T(1,i),T(2,i))
        End if
    End if
End for
```

From this algorithm, all couples of candidate locally parallel faces are numbered $(f_i,f_j)$ in such a way that i<j and $(i,j) \in K$ where $K \subset \{1, \ldots, n\}^2$. The actual local parallelism is then analyzed according to the following strategy.

Step 1.2. Couples of Exactly or Quasi/Locally Parallel Faces

Candidate locally parallel faces (f,g) are either exactly parallel (w.r.t standard geometric tolerance) or quasi/locally parallel. The quasi parallelism condition is detailed now. Get a sampling $\{x_k, k=1,2,3, \ldots\}$ of face f and a sampling $(y_l, l=1,2,3, \ldots)$ of face g. For each k, project point $x_k \in f$ on face g, which yields point $p_k \in g$, and save the distance $a_k=\|p_k-x_k\|$. For each l, project point $y_l \in g$ on face f, which yields point $q_l \in f$, and save the distance $b_k=\|g_l-y_l\|$. Then, note $a_{max}=\max a_k$, $a_{min}=\min a_k$, $b_{max}=\max b_l$, $b_{min}=\min b_l$. Let L(f) be the diagonal length of face f, that is $L(f)=\max\{\|p-q\|, p \in f, q \in f\}$ and let L(g) be the diagonal length of face g, that is L(g)=max{∥p−q∥, p∈g, q∈g}. Then, faces f and g are quasi/locally parallel if:

$$\frac{a_{max} - a_{min}}{L(f)} \leq \tan \varepsilon$$

$$\frac{a_{max} - a_{min}}{a_{min}} \leq 0.1$$

$$\frac{b_{max} - b_{min}}{L(g)} \leq \tan \varepsilon$$

$$\frac{b_{max} - b_{min}}{b_{min}} \leq 0.1$$

Where ε=2.3 deg is the G1 continuity tolerance angle and tan ε≈0.04. Applying this criteria to all couples of candidate locally parallel faces generally reduces the set K.

By definition, lateral faces are faces of the input solid S connecting two locally parallel faces. Lateral faces are reused in a further step for extrapolation purpose. For example, the list of locally parallel faces of the solid shown in FIG. 34 is $(f_1,f_9)$, $(f_3,f_5)$, $(f_5,f_7)$, meaning that K={(1,9), (3,5), (5,7)}. Lateral faces are $f_4$, $f_6$ and $f_{10}$.

Step 1.8. Grouping Tangent Faces Locally Parallel to Tangent Faces

In order to simplify the topology of the resulting mid-surfaces, groups of adjacent and tangent faces that are locally parallel to other groups of adjacent and tangent faces must be Identified. Leftmost drawing in next figure illustrates the situation where some grouping is appropriate. The brute force algorithm would create a complex mid-surface made of many adjacent and tangent faces. The goal of the grouping algorithm is to get a mid-surface featuring a much simpler topology.

FIG. 35 illustrates locally parallel faces. FIG. 36 illustrates the mid-surface obtained without any grouping. The complexity of all faces Is copied on the mid-surface. FIG. 37 illustrates the topology of the mid-surface when the groups $\{f_1,f_2,f_3,f_4\}$ and $\{f_7,f_8,f_9\}$ are considered and when the mid-surface is obtained by offsetting the simplest group $\{f_7,f_8,f_9\}$.

The grouping Is performed according to the following algorithm. The dual graph of the input solid Is considered. Arcs associated with sharp edges are tagged "1" and arcs associated with smooth edges are tagged "0". In the context of the present disclosure, multiple arcs tagged "0" connecting the two same nodes are replaced by a single arc, as Illustrated in FIG. 38. This is very important for cut arcs Identification, as explained in the following.

Figure 39:
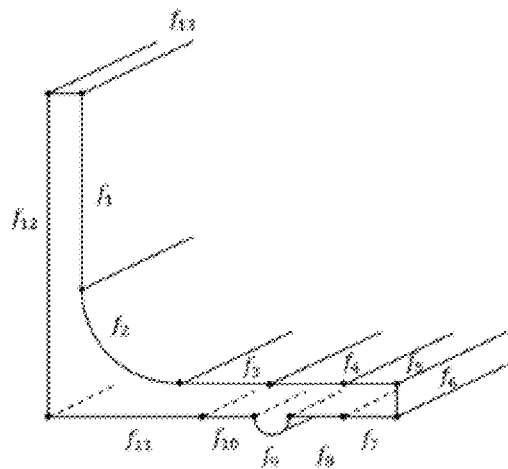
Figure 40:
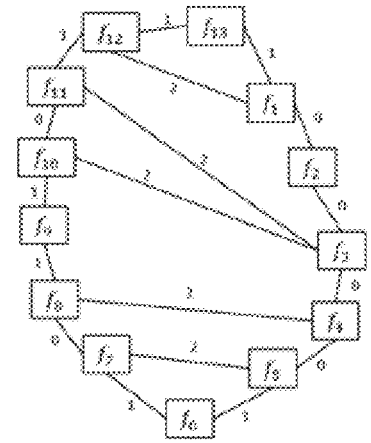

In the context of the present algorithm, the dual graph is enriched with arcs capturing the couples of locally parallel faces, as they are computed in previous step. These arcs are tagged "2", meaning that nodes x and y of the dual graph are connected with an arc tagged "2" when faces x and y are locally parallel. The enriched dual graph, here noted E, is the Input data of the grouping algorithm. Next figure illustrates an extruded solid and its enriched dual graph E. For readability, front and back faces of the extruded solid are Ignored. In the example shown in FIGS. 39-40 the Initial coupling of locally parallel faces is $(f_1,f_{12})$, $(f_3,f_{10})$, $(f_3,f_{11})$, $(f_4,f_8)$, $(f_5,f_7)$. FIG. 39 shows an example of the solid, and FIG. 40 the corresponding enriched dual graph with the initial coupling.

Figure 41:
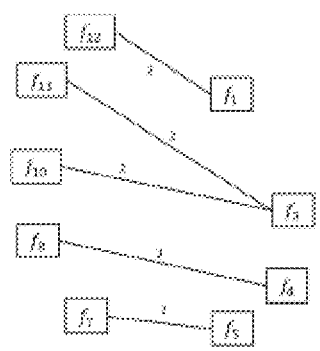
Figure 42:
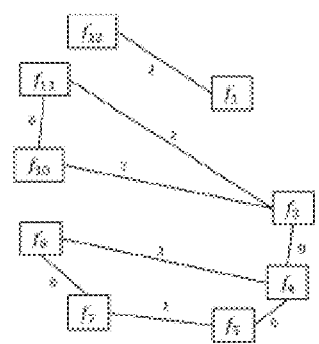

The first step is to collect all arcs tagged "2" and their incident nodes Into a subgraph D of the enriched dual graph E. Then, arcs tagged "0" whose Incident nodes are in graph D are added, which yields graph H. FIG. 41 illustrates graph D of the example. FIG. 42 illustrates graph H of the example.

Figure 43:
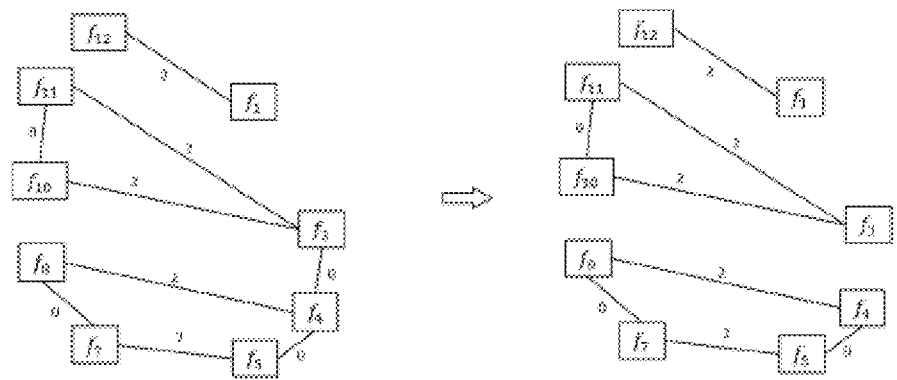

By definition (see F. Harary, *Graph Theory*, Addison-Wesley, 1969, which Is incorporated herein by reference), an arc of a graph is a "cut arc" if removing the said arc creates a new connected component (see again F. Harary, *Graph Theory*, Addison-Wesley, 1969) of the graph. The key step of the grouping algorithm is to remove from graph H all cut arcs that are tagged "0", which yields graph $H_1$. FIG. 43 illustrates the removal of arc connecting nodes $f_3$ and $f_4$, which is a cut arc. Left drawing Is graph H and right drawing is graph $H_1$.

Figure 44:
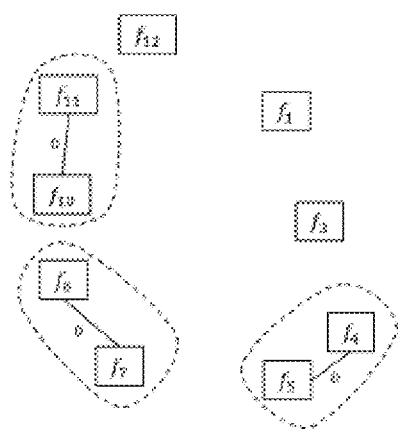
Figure 45:
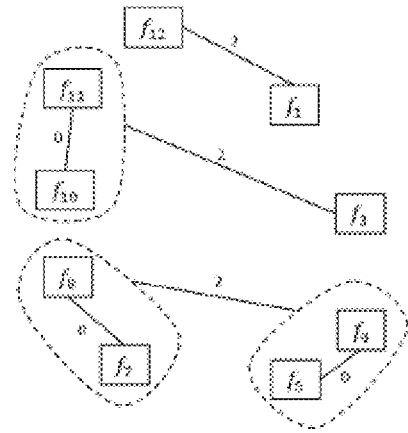

Now, remove from graph $H_1$ all arcs tagged "2", which yields graph $H_2$. Then, groups of faces are Identified through the connected components of graph $H_2$. FIG. 44 illustrates the connected components of graph $H_2$. FIG. 45 shows the resulting groups of adjacent and tangent faces locally parallel to groups of adjacent and tangent faces.

The coupling between the groups is easily obtained using arcs tagged "2" of graph $H_1$, as illustrated in FIG. 45. Groups are noted $\{f_i, \ldots, f_j\}$ and they Include as many elements as necessary. Groups of the example solid are $\{f_{10},f_{11}\}$, $\{f_4,f_5\}$ and $\{f_7,f_8\}$ and the resulting coupling of grouped faces is $(f_1,f_{12})$, $(f_3\{f_{10},f_{11}\})$, $(\{f_7,f_8\},\{f_4,f_5\})$.

Step 2. Local Mid-Surfaces

Local mid-surfaces are now computed according to the following algorithm. A new value $t^+$ is set to a larger value than the input thickness threshold t, typically $t^+=1.1\times t$. The raison d'être of $t^+$ is to avoid tangency configurations, as explained later. An extrapolation value e Is defined, typically e=0.001×D where D is a representative dimension of the input solid. Given a couple $(f_i,f_j)$ of locally parallel faces, and given the list L of lateral faces connecting $f_i$ and $f_j$, create, from face $f_i$ the volume Thick($f_i,t^+$). Then, from face $f_j$, create the extrapolated face Extrapol($f_j$,L,e) and the offset face of this extrapolated face $$\text{Offset}\left(Extrapol(f_j, L, e), \frac{t}{2}\right).$$

The local mid-surface associated with couple $(f_i,f_j)$ is noted Mid($f_i,f_j$) and Is obtained by computing the volume/face Intersection:

$$\text{Mid}(f_i, f_j) := \text{Thick}(f_i, t^+) \cap \text{Offset}\left(Extrapol(f_j, L, e), \frac{t}{2}\right).$$

Figure 46:
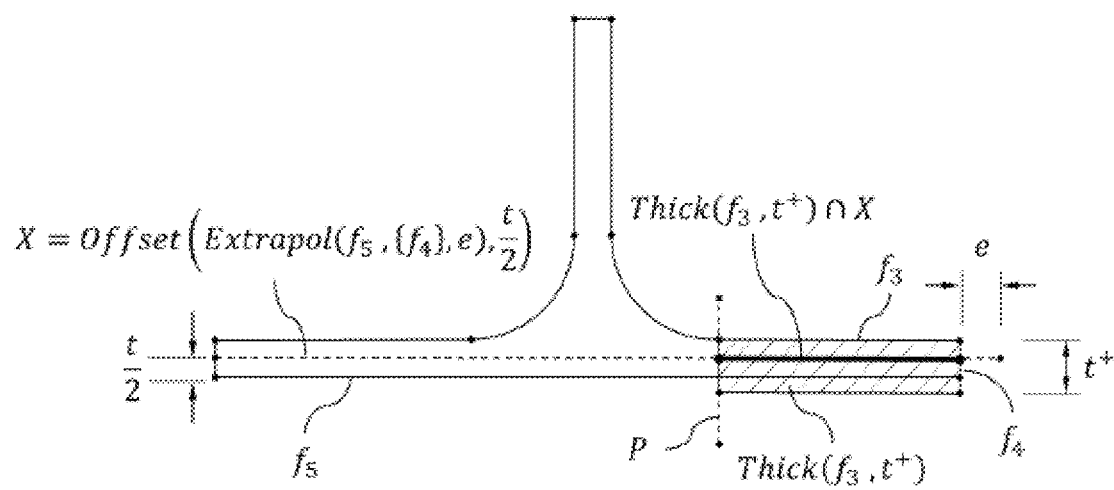

The goal of extrapolation is to perform a safe volume/face intersection because the boundary curve of the (extrapolated) face Is away from the boundary of the volume. FIG. 46 illustrates the local mid-surface of couple $(f_3,f_5)$ connected by lateral face $f_4$. Surface P is a supporting surface Involved in the boundary of Th ick($f_3,t^+$). It is mentioned at this step and reused in a further step.

Given a pairing group $(\{f_1, \ldots, f_n\}, \{f'_1, \ldots, f'_m\})$, the side to offset is chosen to ensure the following objectives:
Capture with fidelity the complexity of this pairing group on the minimal mid-surface, and
Generate a minimal mid-surface result as simple as possible.

To achieve this, the algorithm uses evaluators. The first one Is measuring the complex side of a pairing group $(\{f_1, \ldots, f_n\}, \{f'_1, \ldots, f'_m\})$ based on the area ratio of the faces involved in "quasi parallelism". The second one is measuring the simplicity of a side based on topological (number and type of cells) and geometrical (type of surfaces) criteria.

Step 3. Local Thin Walls

At this step the algorithm localizes thin walls by using volumes, which, in a further step, are used to create local thick regions. For each couple (i,j)∈K of locally parallel faces, faces $f_i$ and $f_j$ are respectively extrapolated according to their connecting lateral faces L. Face $f_i$ is extrapolated with value a and face $f_j$ is extrapolated with value 2e, which is noted Extrapol($f_i$,L,e) and Extrapol($f_j$,L,2e). Then, volume $V_{ij}$ is computed by Intersecting thick volumes Thick (Extrapol($f_i$,L,e),$t^+$) and Thick(Extrapol($f_j$,L,2e),$t^+$):

$$V_{ij} = \text{Thick}(\text{Extrapol}(f_i,L,e),t^+) \cap \text{Thick}(\text{Extrapol}(f_j,L,2e),t^+)$$

Figure 47:
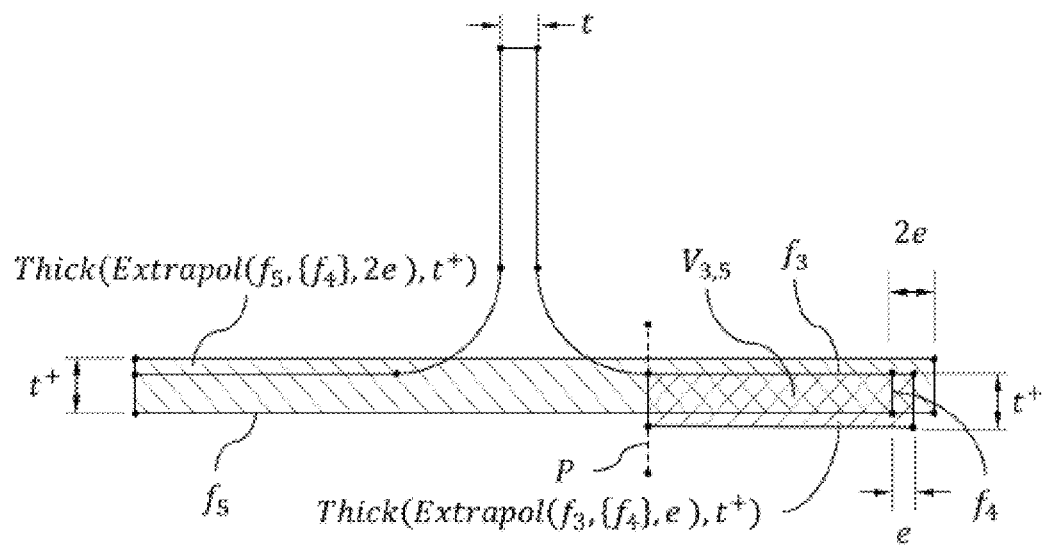

FIG. 47 illustrates volume $V_{3,5}$ used to localize the thin wall defined by the couple of faces ($f_3$,$f_5$) connected by lateral face f. It should be noticed that surface P Is now a supporting surface involved in the boundary of $V_{3,5}$. It is mentioned at this step and reused in a further step.

Step 4. Local Thick Regions

Then, local thick regions are obtained by subtracting all volumes $V_{ij}$, (i,j)∈K from Input solid S. Formally, local thick regions are the connected components of the volume:

$$R = S - \bigcup_{(i,j) \in K}^{n} V_{ij}$$

Figure 48:
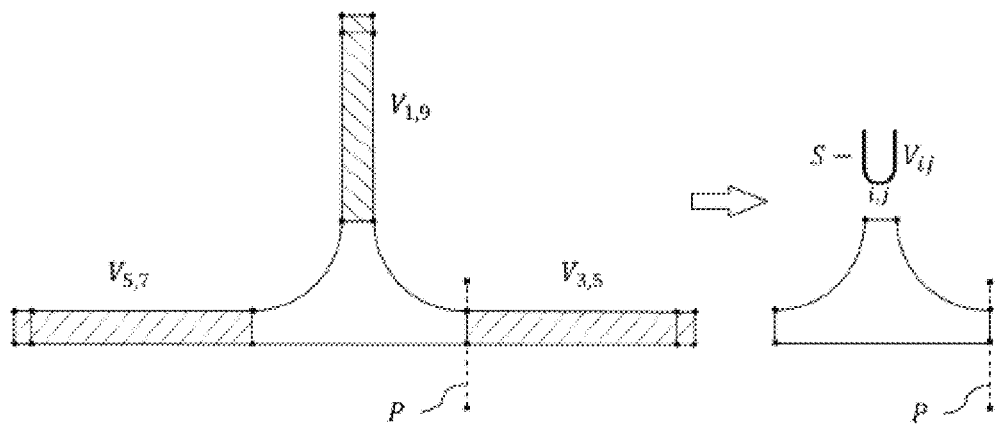

FIG. 48 illustrates the final thick region after all volumes $V_{ij}$ are removed from input solid S. Notice that volumes $V_{ij}$ are wider that solid S in the neighborhood of lateral faces. This is to avoid surface coincidence. Through the sequence of Boolean operations, surface P is now Involved in the boundary of solid R. In the example shown in FIG. 48, there Is only one local thick region, but industrial tests show that numerous local thick regions can exist.

Step 5. Final Non-Manifold Object

Figure 49:
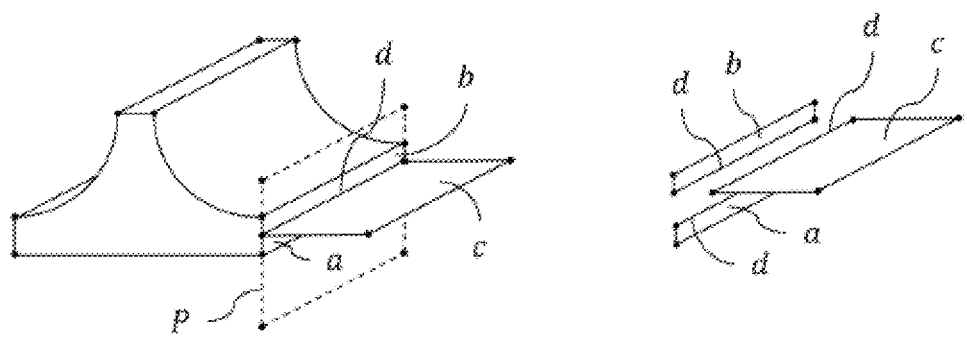

So far, the resulting data is a list of volumes (the local thick regions) and a list of faces (the local mid-surface). The final step Is to build a single non-manifold object mixing volumes and faces into a coherent topological data structure. Typically, the incidence between the boundary face of a volume and a mid-surface is captured by splitting the boundary face and by sharing the splitting edge with the boundary edge of the mid surface. FIG. 49 illustrates the splitting of a volume's lateral face into faces a and b sharing edge d in order to share the said edge d with mid-surface c.

This topology is the best way to provide a mesh such that edges and vertices of triangles meshing face c are shared with edges and vertices of triangles meshing faces a and b. FIG. 51 illustrates a coherent mesh resulting from the non-manifold topology. Conversely, FIG. 50 illustrates what happens when the topology is not solved. The mesh Is defective because triangles of face c do not fit those of face b.

Robustness of the Algorithm it is well known from state of the art that intersecting tangent or overlapping surfaces Is a cause of geometrical algorithms failure. FIGS. 52 to 54 illustrates good, bad and catastrophic situations. Good situation is the Intersection curve of two transverse surfaces, as illustrated in FIG. 52. Bad situation Is a tangent Intersection between two surfaces, as illustrated in FIG. 53. Catastrophic situation is a local overlap of two surfaces, as illustrated in FIG. 54.

Figure 55:
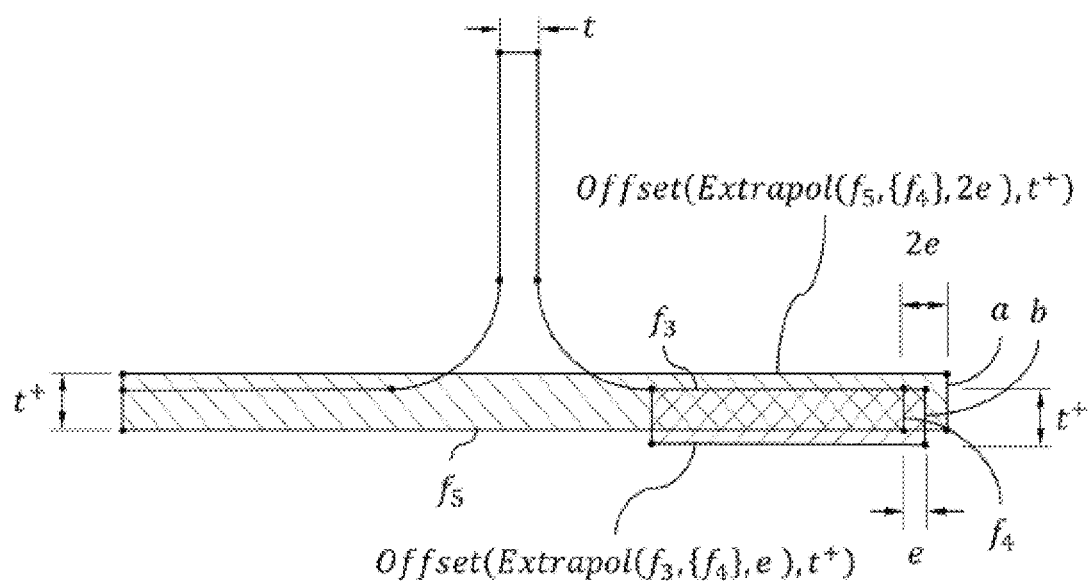

The algorithm allows to avoid overlapping surfaces. During step 3, choosing distinct extrapolation value for Extrapol ($f_i$,L,e) and Extrapol($f_j$,L,2e) avoids overlapping of lateral faces of volume Thick(Extrapol($f_i$,L,e),$t^+$) and volume Thick(Extrapol($f_j$,L,2e),$t^+$). Choosing $t^+$>t makes the intersection for $V_{ij}$ reliable because the offset face of $f_i$, which bounds volume Thick($f_i$,$t^+$), is away from face $f_j$, which bounds volume Thick(Extrapol($f_j$,L,2e),$t^+$) and which is at distance t from $f_i$. Similarly, the offset face of $f_j$, that bounds volume Thick (Extrapol($f_j$,L,2e),$t^+$), is away from face $f_i$, which bounds volume Thick (Extrapol($f_i$,L,e),$t^+$) and which Is at distance t from $f_i$. Furthermore, bounding faces of volume $V_{ij}$ are portions of faces $f_i$ and $f_j$, meaning that they share the respective supporting surfaces. FIG. 55 illustrates that lateral face a is away from lateral face b because of the e extrapolation of face $f_3$ and the 2e extrapolation of face $f_5$. In addition, face Offset(Extrapol($f_5$,($f_4$),2e),$t^+$) is away from face $f_3$, and face Offset(Extrapol($f_3$,{$f_4$},e),$t^+$) is away from face $f_5$.

During step 4, when computing the subtraction S−$V_{ok}$ the portion of faces bounding $V_{ij}$ that coincide with faces bounding input solid S share the same respective supporting surfaces. This makes the subtraction totally safe because the local overlapping of faces is captured by the logical sharing of supporting surfaces as opposed to a hazardous numerical Investigation.

During step 5, the face bounding volume Thick($f_i$,$t^+$) that is used to trim the offset face $$\text{Offset}\left(\text{Extrapol}(f_j, L, e), \frac{t}{2}\right)$$

is also used to trim solid S at step 4. So, the supporting surface, noted P in previous figures, is saved all along the process. This is why there is a perfect fit between the boundary edges of local mid-surfaces and boundary faces of local thick regions.

Figures 56, 57:
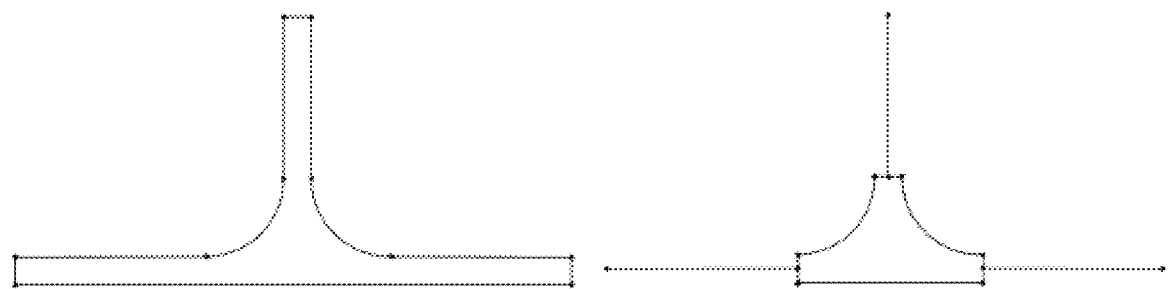
Figures 58, 59:
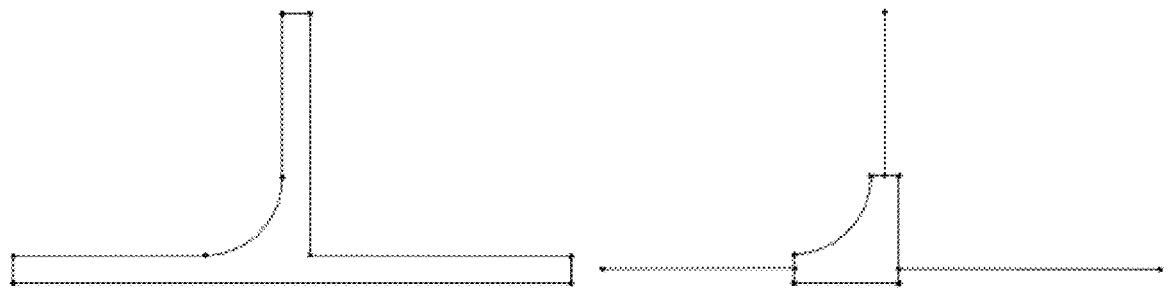
Figures 60, 61:
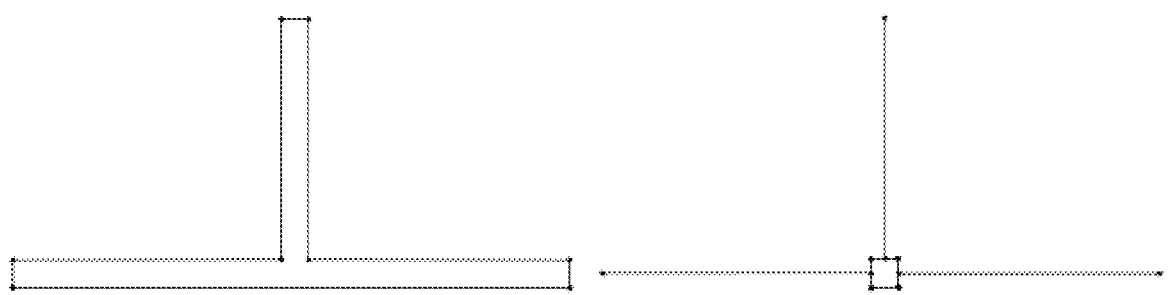
Figures 66, 67:
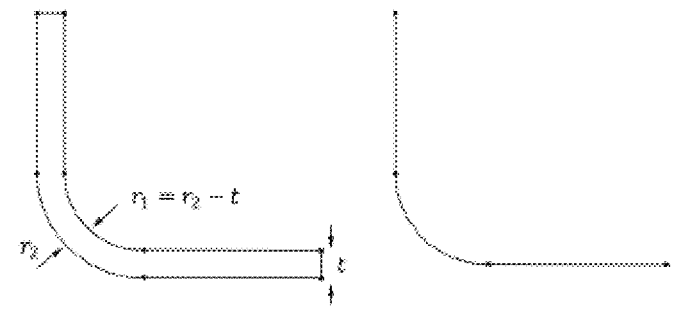
Figures 68, 69:
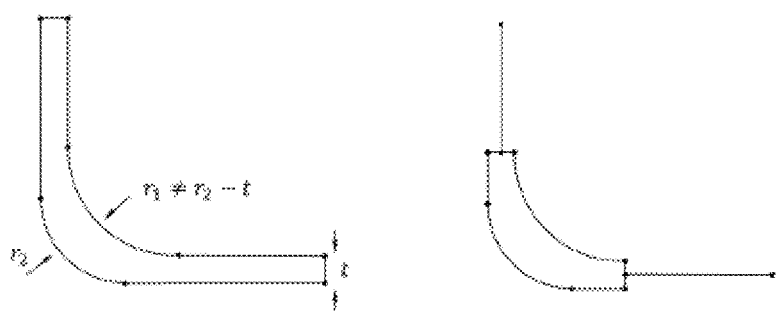

FIGS. 56 to 69 illustrate the algorithm. FIG. 56 shows an input solid and FIG. 57 the corresponding output object computed by the algorithm. FIG. 58 shows an input solid and FIG. 59 the corresponding output object computed by the algorithm. FIG. 60 shows an input solid and FIG. 61 the corresponding output object computed by the algorithm. FIG. 62 shows an input solid and FIG. 63 the corresponding output object computed by the algorithm. FIG. 64 shows an input solid and FIG. 65 the corresponding output object computed by the algorithm. FIG. 66 shows an input solid and FIG. 67 the corresponding output object computed by the algorithm. FIG. 68 shows an Input solid and FIG. 69 the corresponding output object computed by the algorithm.

Figure 70:
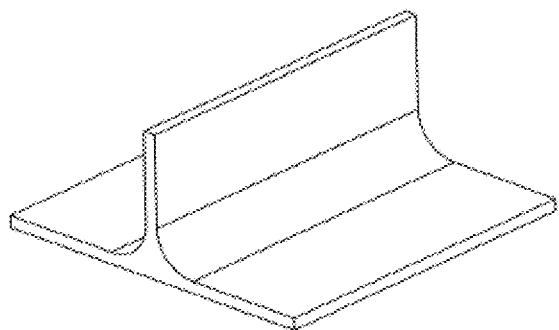

These figures illustrate the fact that, given a solid part modeled by Its B-Rep, and given a thickness threshold, the algorithm Identifies all thin walls of the input solid. Then, the mid-surface of each thin wall is computed as well as local volumes to materialize the thin walls. Thick regions are obtained by removing local volumes from the input solid. The resulting data Is the mixed set of thick regions and mid-surfaces arranged in a coherent topology, as Illustrated in FIGS. 70-73. FIG. 70 shows an Input solid and FIG. 71 the corresponding output object computed by the algorithm. FIG. 72 shows an input solid representing an ejector pad, such as the ejector pad 96 or 98 of FIG. 9 and FIG. 73 the corresponding output object computed by the algorithm. The thick pad Is kept unchanged while the crossing rib is approximated by a surface.

The method may further comprise displaying the constructed second B-rep.

The method may further comprise meshing S30 the second B-rep Into a hybrid mesh.

The meshing S30 may be carried out by any known method.

In examples, the meshing S30 comprises meshing differently thin-sheet regions, long-slender regions, and complex regions of the second B-rep. A thin-sheet region Is a mid-surface of the second B-rep, having two principal dimensions much longer than the third. In the second B-rep, the thin-sheet regions are the respective mid-surfaces. A long-slender region is a region of the second B-rep having one principal dimension much longer than the other two. A complex region is a region of the second B-rep which is neither a long-slender region nor a thin-sheet region. It may represent Isotropic element shapes. The meshing S30 in these examples may comprise:

meshing thin-sheet regions/mid-surfaces of the second B-rep with triangle or quadrangle elements. Where a mid-surface meets a complex or long-slender regions, the meshing may comprise applying a seeding equal to that of the adjoining region; and meshing complex regions with hexahedral or tetrahedral volume elements.

The meshing S30 according to the currently-discussed examples may notably be carried out according to the meshing method described in section 4 of Tierney & al., *Automatic dimensional reduction and meshing of stiffened thin-wall structure,* Article in Engineering With Computers, October 2013, DOI: 10.1007/s00366-013-0317-y, which is incorporated herein by reference.

The meshing S30 may be carried out by user action, e.g. by a graphical user-interaction. For example, the user may graphically define the elements of the hybrid mesh, e.g. by clicking on locations of the second B-rep for placing elements and/or by displacing elements and/or by arranging elements between them. For that, the method may display the second B-rep to the user during the meshing S30.

Figure 71:
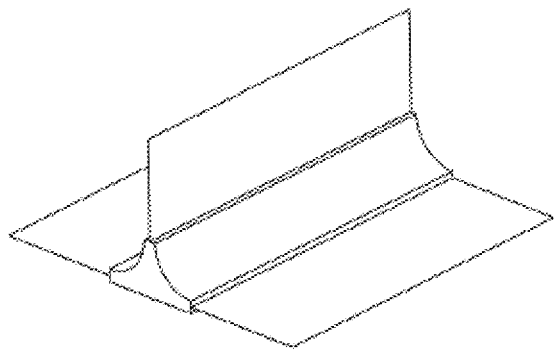
Figure 72:
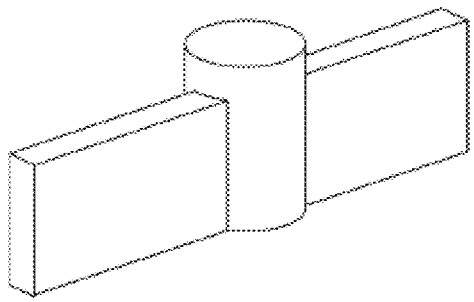
Figure 73:
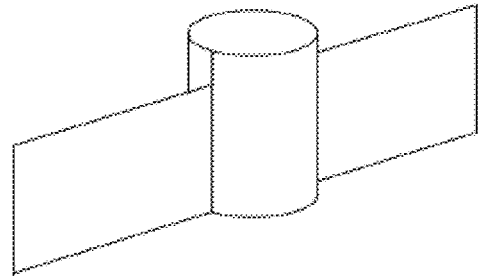
Figure 74:
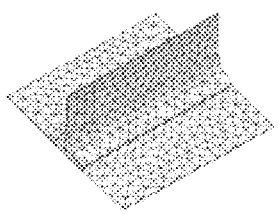

FIG. 74 shows the hybrid mesh resulting from an example of the meshing S30 performed on the second B-rep shown in FIG. 71.

The method may further comprise performing S40 a structural simulation of the mechanical part based on the hybrid mesh. The structural simulation may be any simulation of the structural behavior of the mechanical part, e.g. for functionality, compliance, and/or quality purpose. The structural simulation is thus a structural mechanics simulation. The method may in addition further perform other types of simulation in addition, such as vibrations simulation, heat transfer simulation, mass transport simulation, electromagnetism simulation, and/or fluid mechanics simulation.

Performing S40 the structural simulation comprises defining boundary conditions on the hybrid mesh representing the mechanical part. Defining boundary conditions may be performed by a user, e.g. by graphical user-Interaction, and may include one or more of: fixing one or more portions of the mechanical part, defining a vibration source, and/or defining a heat source. Performing S40 the structural simulation may further comprise running a numerical scheme, such as a finite element method (FEM), on the hybrid mesh. The numerical scheme may be any numerical scheme pertaining to the discretization of the physics equations/laws encapsulating the structural behavior to simulate.

The method may further comprise displaying the result(s) of the structural simulation to a user, e.g. for performing a structural analysis of the mechanical part and/or taking manufacturing decisions.

Figure 75:
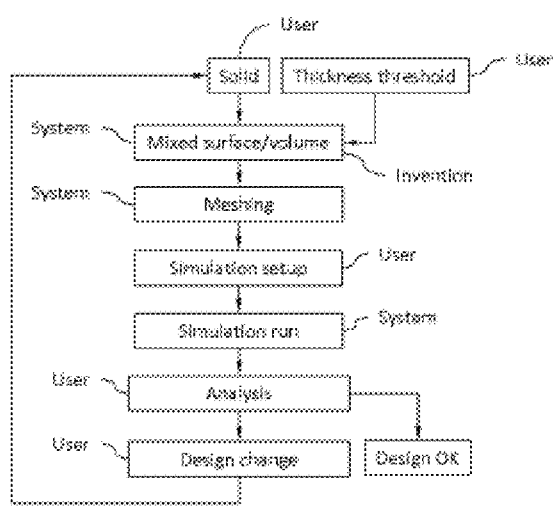

FIG. 75 shows a design flowchart that the method may in examples implement, for designing a mechanical part. The method allows a fast design change loop, as computing time is saved. This means shorter design time and earlier time-to-market or alternate design Investigations.

The invention claimed is:

1. A computer-implemented method of B-rep processing for performing structural simulation of a mechanical part, the method comprising:
obtaining:
a first B-rep forming a solid representing the mechanical part, and
a predetermined thickness threshold;
constructing, based on the first B-rep, a second B-rep forming a non-manifold object representing the mechanical part, the constructing including:
identifying one or more thin regions of the first B-rep, each thin region having a thickness smaller than the predetermined thickness threshold, and
computing, for each identified thin region, a respective mid-surface of the identified thin region, and replacing the identified thin region by the respective mid-surface,
meshing the second B-rep with a hybrid mesh having both 2D and 3D mesh elements, by meshing each mid-surface with a 2D element and meshing each solid part of the second B-rep with 3D elements; and
performing a structural simulation of the mechanical part based on the hybrid mesh which meshes the second B-rep, the 2D mesh elements meshing each mid-surface improving computer-efficiency of the simulation.

2. The method of claim 1, wherein the identifying of the one or more thin regions comprises determining first and second groups each of one or more adjacent and tangent faces of the first B-rep, each first group being locally parallel to a respective second group and forming with the respective second group at least a part of a boundary of a thin region.

3. The method of claim 2, wherein the determining of the first and second groups includes:
determining faces of the first B-rep each locally parallel to a respective other face, and
grouping first determined adjacent and tangent faces locally parallel to second determined adjacent and tangent faces into first and second groups.

4. The method of claim 3, wherein the determining of the faces includes:
determining candidate faces, a candidate face being a first face of the first B-rep for which a point is at a distance lower than the thickness threshold from a second face of the first B-rep, and
determining, among candidate faces, first and second faces, each first face being locally parallel to a respective second face.

5. The method of claim 2, wherein two faces are locally parallel when:
a ratio between a largest distance between the faces and a smallest distance between the faces is lower than one plus a threshold, and/or
a ratio between a difference between a largest distance between the faces and a smallest distance between the faces and at least one diagonal length of the faces is lower than a tangent of a G1 continuity tolerance angle.

6. The method of claim 2, wherein the computing of a respective mid-surface for each identified thin region includes, for each determined first group locally parallel to a determined respective second group, computing, as a mid-surface, an intersection between a result of a first thickening operation of the first group and a result of an offset operation of the respective second group.

7. The method of claim 6, wherein:
the offset operation is an offset of an extrapolation of the respective second group, and/or
the first thickening operation has a thickening distance larger than the thickness threshold.

8. The method of claim 2, wherein the constructing further includes computing one or more local thick regions of the first B-rep, the computing of the one or more local thick regions including:
for each determined first group locally parallel to a determined respective second group, computing an intersection of a result of a second thickening operation of the first group and a result of a third thickening operation of the respective second group, and subtracting from the first B-rep each computed intersection.

9. The method of claim 8, wherein:
the second thickening operation of the first group is a thickening of an extrapolation of the first group, and the third thickening operation of the respective second group is a thickening of an extrapolation of the respective second group, the extrapolation of the first group and the extrapolation of the respective second group having different extrapolation values, and/or
the third thickening operation and the second thickening operation have each a thickening distance larger than the thickness threshold.

10. The method of claim 8, wherein the replacing including assembling the respective mid-surface with a respective computed thick region by assembling a boundary edge of the respective mid-surface with a splitting edge of the respective computed thick region.

11. The method of claim 1, further comprising meshing the second B-rep into a hybrid mesh.

12. The method of claim 11, further comprising performing a structural simulation of the mechanical part based on the hybrid mesh.

13. A non-transitory computer readable storage medium having recorded thereon a computer program comprising instructions for performing a method of B-rep processing for performing structural simulation of a mechanical part, the method comprising:
obtaining:
a first B-rep forming a solid representing the mechanical part, and
a predetermined thickness threshold;
constructing, based on the first B-rep, a second B-rep forming a non-manifold object representing the mechanical part, the constructing including:
identifying one or more thin regions of the first B-rep, each thin region having a thickness smaller than the predetermined thickness threshold, and
computing, for each identified thin region, a respective mid-surface of the identified thin region, and replacing the identified thin region by the respective mid-surface,
meshing the second B-rep with a hybrid mesh having both 2D and 3D mesh elements, by meshing each mid-surface with a 2D element and meshing each solid part of the second B-rep with 3D elements; and
performing a structural simulation of the mechanical part based on the hybrid mesh which meshes the second B-rep, the 2D mesh elements meshing each mid-surface improving computer-efficiency of the simulation.

14. The non-transitory computer readable storage medium of claim 13, wherein the identifying of the one or more thin regions includes determining first and second groups each of one or more adjacent and tangent faces of the first B-rep, each first group being locally parallel to a respective second group and forming with the respective second group at least a part of a boundary of a thin region.

15. The non-transitory computer readable storage medium of claim 14, wherein the determining of the first and second groups includes:
determining faces of the first B-rep each locally parallel to a respective other face, and
grouping first determined adjacent and tangent faces locally parallel to second determined adjacent and tangent faces into first and second groups.

16. The non-transitory computer readable storage medium of claim 15, wherein the determining of the faces includes:
determining candidate faces, a candidate face being a first face of the first B-rep for which a point is at a distance lower than the thickness threshold from a second face of the first B-rep, and
determining, among candidate faces, first and second faces, each first face being locally parallel to a respective second face.

17. A computer comprising:
a processor coupled to a memory and a graphical user-interface, the memory having recorded thereon a computer program comprising instructions for performing structural simulation of a mechanical part that when executed by the processor causes the processor to be configured to:
obtain:
a first B-rep forming a solid representing the mechanical part, and
a predetermined thickness threshold;
construct, based on the first B-rep, a second B-rep forming a non-manifold object representing the mechanical part,
wherein the processor is further configured to construct the second B-rep by being configured to:
identify one or more thin regions of the first B-rep, each thin region having a thickness smaller than the predetermined thickness threshold, and
compute, for each identified thin region, a respective mid-surface of the identified thin region, and replacing the identified thin region by the respective mid-surface,
mesh the second B-rep with a hybrid mesh having both 2D and 3D mesh elements, by meshing each mid-surface with a 2D element and meshing each solid part of the second B-rep with 3D elements; and
perform a structural simulation of the mechanical part based on the hybrid mesh which meshes the second B-rep, the 2D mesh elements meshing each mid-surface improving computer-efficiency of the simulation.

18. The computer of claim 17, wherein the processor is further configured to identify the one or more thin regions by being configured to determine first and second groups each of one or more adjacent and tangent faces of the first B-rep, each first group being locally parallel to a respective second group and forming with the respective second group at least a part of a boundary of a thin region.

19. The computer of claim 18, wherein the processor is further configured to determine the first and second groups by being configured to:
- determine faces of the first B-rep each locally parallel to a respective other face, and
- group first determined adjacent and tangent faces locally parallel to second determined adjacent and tangent faces into first and second groups.

20. The computer of claim 19, wherein the processor is further configured to determine the faces by being configured to:
- determine candidate faces, a candidate face being a first face of the first B-rep for which a point is at a distance lower than the thickness threshold from a second face of the first B-rep, and
- determine, among candidate faces, first and second faces, each first face being locally parallel to a respective second face.

\* \* \* \* \*